(12) United States Patent
Okubo et al.

(10) Patent No.: US 8,064,445 B2
(45) Date of Patent: Nov. 22, 2011

(54) LAYER 2 MOBILITY NETWORK

(75) Inventors: Akira Okubo, Tokyo (JP); Kouichi Ishibashi, Tokyo (JP); Masahiro Kuroda, Tokyo (JP)

(73) Assignees: Mitsubishi Electric Corporation, Tokyo (JP); National Institute of Information and Communications Technology, Tokyo (JP)

( * ) Notice: Subject to any disclaimer, the term of this patent is extended or adjusted under 35 U.S.C. 154(b) by 1092 days.

(21) Appl. No.: 11/886,437

(22) PCT Filed: Mar. 14, 2005

(86) PCT No.: PCT/JP2005/004459
§ 371 (c)(1),
(2), (4) Date: Sep. 14, 2007

(87) PCT Pub. No.: WO2006/097989
PCT Pub. Date: Sep. 21, 2006

(65) Prior Publication Data
US 2008/0192668 A1  Aug. 14, 2008

(51) Int. Cl.
*H04L 12/28* (2006.01)
*H04L 12/56* (2006.01)
(52) U.S. Cl. ............................... 370/390; 370/401
(58) Field of Classification Search .............. None
See application file for complete search history.

(56) References Cited

U.S. PATENT DOCUMENTS

| 6,532,233 B1 * | 3/2003 | Matsunaga et al. | 370/390 |
| 7,400,601 B2 * | 7/2008 | Moritani et al. | 370/331 |
| 7,512,124 B2 * | 3/2009 | Sangroniz et al. | 370/390 |
| 2004/0103282 A1 | 5/2004 | Meier et al. | |
| 2005/0054353 A1 * | 3/2005 | Mademann | 455/458 |

FOREIGN PATENT DOCUMENTS

| EP | 1 463 247 A2 | 3/2004 |
| JP | 3325856 B2 | 7/2002 |
| JP | 2004-48334 A | 2/2004 |
| JP | 3526027 B2 | 2/2004 |
| JP | 2004-112724 A | 4/2004 |
| JP | 2004-297521 | 10/2004 |
| JP | 2004-343243 A | 12/2004 |
| WO | WO2004-088930 A1 | 10/2004 |

(Continued)

OTHER PUBLICATIONS

Christensen M., et al. "Consideration for IGMP and MLD Snooping Switches <draft-ietf-magma-snoop-12.-txt>" Standard-Working Draft, Internet Engineering Task Force, IETF, vol. 12, Feb. 2005, pp. 1-23. XP015038581.

(Continued)

*Primary Examiner* — Gregory Sefcheck
*Assistant Examiner* — Ashley Shivers
(74) *Attorney, Agent, or Firm* — Birch, Stewart, Kolasch & Birch, LLP

(57) ABSTRACT

When an apparatus located at an edge of a network transmits a report message in a multicast procedure transmitted from a mobile terminal to a gateway switch, the apparatus snoops the report message and transmits an entry update request frame for causing an entry forming a transfer route for multicast to be learned in a direction of the gateway switch. The gateway switch transfers the received report message to a port to which an IP multicast router is connected after the transfer router for multicast is formed.

9 Claims, 12 Drawing Sheets

FOREIGN PATENT DOCUMENTS

WO WO-2005/032061 A1 4/2005
WO WO-2005/032062 A1 4/2005

OTHER PUBLICATIONS

I. Wu et al., Cisco Systems Router-port Group Management Protocol (RGMP), RFC 3488, [online], Feb. 2003, [retrieved on May 12, 2005]/ Retrieved from the Internet: <URL:http://www.ietf.org/rfc/rfc3488.txt?number=3488>.

D. Farinacci et al., Cisco Group Management Protocol (CGMP), [online], Aug. 14, 1996, [retrieved and May 12, 2005]. Retrieved from the Internet: <URL:ftp://ftpeng/cisco/com/ipmulticast/specs/cgmp.txt>.

Yuki Moritani et al., The Institute of Electronics, Information and Communication Engineers, "A Hand-off Scheme for Multicast Receivers Responding to IGMP-Snooping", pp. 87-92.

\* cited by examiner

LAYER 2 MOBILITY NETWORK

TECHNICAL FIELD

The present invention relates to a layer 2 mobility network, which is a integrated heterogeneous mobile wireless network in which heterogeneous wireless access systems are integrated in a layer 2 base, and, more particularly to a layer 2 mobility network that carries out multicast communication.

BACKGROUND ART

In mobile communication, not only voice communication but also the access to the Internet, distribution/communication of electronic mails and images, and the like can be relatively easily performed. Therefore, the mobile communication is used by a large number of people because of its convenience. In recent years, further development for an increase in speed and capacity is expected. In a situation in which the second generation (2G) and the third generation (3G) cellular systems and wireless access systems such as a wireless LAN are diversified, as the next generation wireless network after the third generation, a system for carrying out multicast communication according to a multicast procedure "IGMP (Internet Group Management Protocol)/MLD (Multicast Listener Discovery)" in a integrated heterogeneous mobile wireless network, in which heterogeneous wireless access systems are integrated in a layer 2 base, is examined.

As an example of the system, there is "Handoff for multicast receiver that takes into account IGMP-Snooping" described in a Non-Patent Literature 1. An outline of the Non-Patent Literature 1 is explained below referring to FIGS. 11 to 13. FIG. 11 is a conceptual diagram of a structure of the conventional integrated heterogeneous mobile wireless network described in the Non-Patent Literature 1. FIG. 12 is a sequence chart for explaining a control operation for handoff carried out in the same sub-network in the integrated heterogeneous mobile wireless network shown in FIG. 11. FIG. 13 is a sequence chart for explaining a control operation for handoff carried out between different sub-networks in the integrated heterogeneous mobile wireless network shown in FIG. 11.

In FIG. 11, contents such as streaming data provided by a source (a transmission source: Multicast Sender) 701 of multicast communication are input to a multicast router (MR1). Under the multicast router (MR1) 201, a multicast router (MR2) 202 and a multicast router (MR3) 203 are arranged to provide a mobile terminal (MH: Mobile Host) 601 with multicast delivery.

A switch (SW1) 401 is connected to the multicast router (MR2) 202. The switch (SW1) 401 has an IGMP-Snooping (Internet Group Management Protocol-Snooping) function of connecting a wireless base station (Base Station: BS1) 501 and a wireless base station (BS2) 502 subordinate to the switch (SW1) 401 to the multicast router (MR2) 202.

A switch (SW2) 402 is connected to the multicast router (MR2) 203. The switch (SW2) 402 has an IGMP-Snooping function of connecting a wireless base station (BS3) 503 and a wireless base station (BS2) 504 subordinate to the switch (SW2) 402 to the multicast router (MR3) 203.

In this network, to increase speed of a handoff operation for a multicast receiver, agents 301 and 302 called MSAs (Mobility Support Agents) are arranged for respective sub-networks. In FIG. 11, the agent (MSA1) 301 is connected to the switch (SW1) 401 and the agent (MSA2) 302 is connected to the switch (SW2) 402.

A handoff control operation carried out in the network shown in FIG. 11 is explained below. First, a handoff control operation in the same sub-network is performed as shown in FIG. 12. In FIG. 12, the mobile terminal MH is receiving multicast data (Multicast Data) through a route of the multicast router MR1, the switch SW1, and the wireless base station BS1 (S1001). When the mobile terminal MH performs handoff to the wireless base station BS2 (S1002), the mobile terminal MH transmits in a wireless manner an IGMP report message (IGMP Report) to the wireless base station BS2 as soon as possible in a process in which the wireless base station BS1 is transmitting in a wireless manner multicast data (Multicast Data) received from the switch SW1 (S1003). This IGMP report message is communicated from the wireless base station BS2 to the switch SW1 (S1004).

When the switch SW1 receives the IGMP report message, the switch SW1 transfers the multicast data (Multicast Data) transmitted from the multicast router MR1 to both the wireless base stations BS1 and BS2 (S1005). Consequently, the mobile terminal MH can continuously receive the multicast data (Multicast Data) in a new location.

The mobile terminal MH transmits in a wireless manner an advertisement request message (Advertisement Request) to the wireless base station BS2 by broadcast (Broadcast). This advertisement request message is transferred to the agent (MSA1) through the switch SW1 (S1006). When the agent (MSA1) receives the advertisement request message, the agent (MSA1) delivers an advertisement message (Advertisement) including a network prefix by broadcast (Broadcast). This advertisement message (Advertisement) is delivered to the mobile terminal MH through the switch SW1 and the wireless base station BS2 (S1007).

When the mobile terminal MH receives the advertisement message (Advertisement), the mobile terminal MH compares a previous prefix and the prefix included in the advertisement (Advertisement) and judges whether a handoff form is handoff in the same sub-network or handoff between different sub-networks. When the mobile terminal MH judges that the handoff form is the handoff in the same sub-network, the mobile terminal MH transmits in a wireless manner an IGMP leave message (IGMP Leave) to give trigger for checking a port of a receiver present under the switch SW1 to the switch SW1. This IGMP leave message is transferred to the multicast router MR1 through the wireless base station BS2 and the switch SW1 (S1008).

When the multicast router MR1 receives the IGMP leave message, the multicast router MR1 transmits an IGMP query message (IGMP Query (Group Specific)) to check whether receivers are present under the wireless base stations BS1 and BS2. This IGMP query message is transferred from the switch SW1 to both the wireless base station sBS1 and BS2 (S1009).

When the mobile terminal MH receives the IGMP query message, the mobile terminal MH transmits in a wireless manner an IGMP report message (IGMP Report) to the wireless base station BS2. This IGMP report message is communicated from the wireless base station BS2 to the switch SW1 (S1010). Consequently, the switch SW1 continuously delivers the multicast data (Multicast Data) to a port to which the wireless base station BS2, which is a new location of the mobile terminal MH, is connected. On the other hand, because there is no response to the IGMP query message from a port to which the wireless base station BS1, which is a previous location of the mobile terminal MH, is connected, the switch SW1 stops the distribution of the multicast data (Multicast Data) to the port to which the wireless base station BS1 is connected (S1011).

A handoff control operation between different sub-networks is performed as shown in FIG. 13. In FIG. 13, the mobile terminal MH is receiving multicast data (Multicast Data) through a route of the multicast routers MR1 and MR2, the switch SW1, and the wireless base station BS2 (S1011). When the mobile terminal MH performs handoff to the wireless base station BS3 (S1012), the mobile terminal MH transmits in a wireless manner an IGMP report message (IGMP Report) to the wireless base station BS3 as soon as possible in a process in which the wireless base station BS2 is transmitting in a wireless manner multicast data (Multicast Data) received from the switch SW1 (S1013). This IGMP report message is communicated from the wireless base station BS3 to the switch SW3 and the multicast router MR3 (S1014).

When the multicast router MR receives the IGMP report message from the multicast router MR3, the multicast router MR1 delivers the multicast data (Multicast Data) to both the multicast routers MR2 and MR3 (S1015). Consequently, the mobile terminal MH can continuously receive the multicast data (Multicast Data) in a new location.

The mobile terminal MH transmits in a wireless manner an advertisement request message (Advertisement Request) to the wireless base station BS3 by broadcast (Broadcast). This advertisement request message is transferred to the agent (MSA2) through the wireless base station BS3 and the switch SW2 (S1016). When the agent (MSA2) receives the advertisement request message, the agent (MSA2) delivers an advertisement message (Advertisement) including a network prefix by broadcast. This advertisement message (Advertisement) is delivered to the mobile terminal MH through the switch SW2 and the wireless base station BS3 (S1017).

When the mobile terminal MH receives the advertisement message (Advertisement), the mobile terminal MH updates an address (S1018) because handoff between different sub-networks is performed and transmits in a wireless manner a leave request message (Leave Request) to the agent MSA1 in a sub-network at a previous location. This leave request message (Leave Request) is transferred to the agent MSA1 through the wireless base station BS3, the switch SW2, the multicast routers MR3, MR1, and MR2, and the switch SW1 (S1019).

The agent MSA1 in the sub-network in the previous location transmits an IGMP leave message (IGMP Leave) to the multicast router MR2 through the switch SW1 as a response (S1020). When the multi-cast router MR2 receives the IGMP leave message (IGMP Leave), the multicast router MR2 transmits an IGMP query message (IGMP Query (Group specific)) to check whether a receiver is present under the wireless base station BS2. This IGMP query message is transferred from the switch SW1 to the wireless base station BS2 (S1021). However, since there is no receiver, no response is received. Consequently, both the switch SW1 in the previous location and the multicast router MR2 stop the distribution of the multicast data (Multicast Data). The mobile terminal MH can continue to receive the distribution of the multicast data (Multicast Data) in a new location through a distribution route of the multicast router MR3, the switch SW2, and the wireless base station BGS3 (S1022).

As described above, in the conventional integrated heterogeneous mobile wireless network shown in FIG. 11, the IGMP report message is transmitted immediately after movement to realize a reduction in a delay time until the start of multicast packet reception after the movement. It is identified whether handoff is the handoff in the same sub-network or the handoff between the different sub-networks from broadcast information (Advertisement). The mobile terminal directly transmits the IGMP leave message (IGMP-Leave) when the handoff is the handoff in the same sub-network and transmits the IGMP leave message (IGMP-Leave) in cooperation with the agent MSA when the handoff is the handoff between the different sub-networks. In this way, a reduction in a delay time until the stop of the distribution of a multicast packet in the previous location wireless base station is realized.

Non-Patent Literature 1: Yuki Moritani, Kensho Matsumoto, Ken-ichi Yamasaki "Handoff for a multicast receiver that takes into account IGMP-Snooping" The Institute of Electronics, Information and Communication Engineers Transaction (NS2003-104, NS2003-70, CS2003-79 (2003-09), FIGS. 1 to 3)

DISCLOSURE OF INVENTION

Problem to be Solved by the Invention

In the conventional mobile network in which the heterogeneous wireless access systems are integrated, multicast communication is realized. However, there is a problem in that, to stop unnecessary transfer (forwarding) involved in the movement of a mobile terminal, which is a multicast receiver, and control traffic during multicast delivery, all switches constituting a sub-network under a multicast router have to be implemented with an IGMP-Snooping function.

The IGMP query message (IGMP-Query) transmitted from the multicast router to check presence of the multicast receiver is propagated to the entire sub-network. Thus, as the number of mobile terminals and the structure of the sub-network increase, a traffic amount increases. There is also a problem in that, concerning the IGMP report message (IGMP-Report) transmitted by the mobile terminal to the multicast router to request multicast delivery, a traffic amount increases according to the number of mobile terminals and the number of times of handoff. In the above explanation, IGMP of IPv4 is used for the multicast procedure. However, the same holds true when MLD of IPv6 is used.

The present invention has been devised in view of the above and it is an object of the present invention to obtain a layer 2 mobility network as a integrated heterogeneous mobile wireless network that can stop unnecessary transfer (forwarding) and suppress traffic during multicast delivery even if all switches constituting a sub-network are not implemented with a function of snooping various messages in a multicast procedure "IGMP/MLD" and also suppresses control traffic related to the multicast procedure "IGMP/MLD" and is excellent in scalability.

Means for Solving Problem

To achieve the above object, a layer 2 mobility network according to the present invention includes a layer 2 switch that is a base of a heterogeneous wireless access system;, an IP multicast router that performs a mutual connection in an IP layer with an external network to which a source of a multicast communication is connected; and a gateway switch interposed between a plurality of the layer 2 switches and the IP multicast router connected via a relay transfer path. As functions of executing a multicast delivery to a mobile terminal, an apparatus located at an edge of the network, including a radio access point of the heterogeneous wireless access system or the layer 2 switch, has a first function of transmitting a report message in a multicast procedure transmitted from the mobile terminal to the gateway switch and snooping the report message to learn a transfer route for multicast and a second function of transmitting an entry update request frame for causing an entry forming the learned transfer route for multicast in a direction of the gateway switch, and the gateway switch has a function of transferring a received report message to a port to which the IP multicast router is connected after the transfer route for multicast is formed.

According to the present invention, the switches and the gateway switch constituting the relay transfer path that connects the layer 2 switch and the gateway switch can learn the entry forming the transfer route for multicast according to the entry update request frame from the apparatus located at the edge of the network and establish the route for multicast delivery to the mobile terminal even if the switches are not implemented with the function of snooping the report message transmitted by the mobile terminal to request multicast delivery. The gateway switch can confirm, by receiving the entry update request frame from the relay transfer path, that the transfer route for multicast is formed. Thus, the gateway switch can transfer the report message for requesting multicast delivery to the IP multicast router with the reception of the entry update request frame from the relay transfer path as a trigger. Consequently, it is possible to start multicast delivery to the mobile terminal within a relatively short time.

Effect of the Invention

According to the present invention, there is an effect that it is possible to establish a route for IP multicast delivery to the mobile terminal even if all the switches constituting the sub-network are not implemented with the function of snooping the report message for the multicast procedure.

EXPLANATIONS OF LETTERS OR NUMERALS

Figure 1:
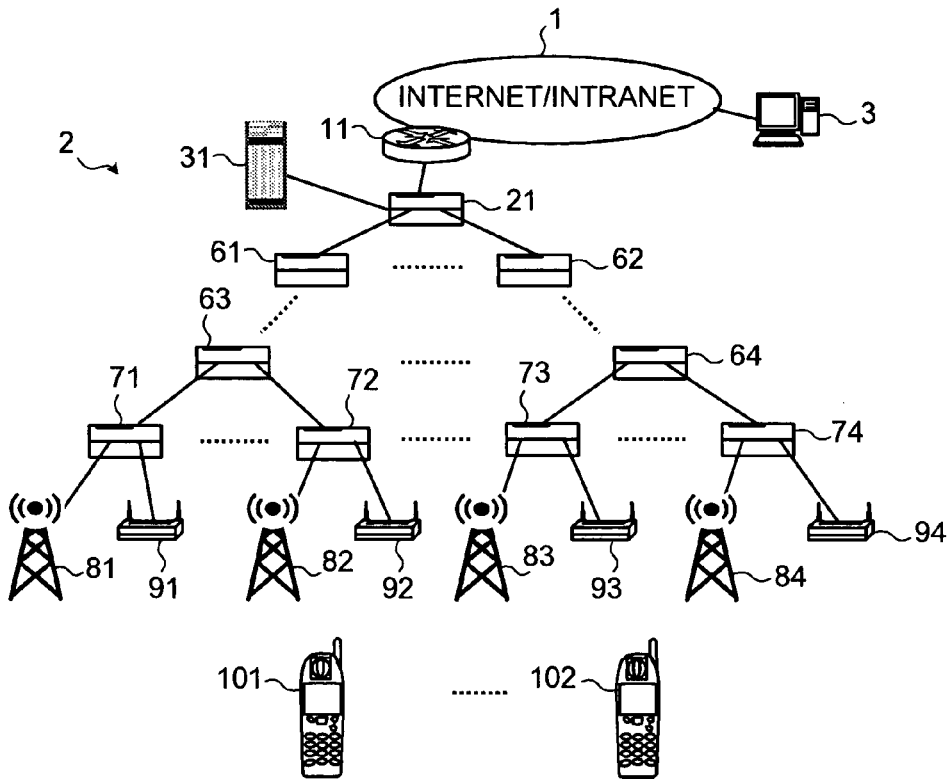
FIG. 1 is a conceptual diagram of a structure of a layer 2 mobility network as a integrated heterogeneous mobile wireless network according to a first embodiment of the present invention.

1 External network
2 Layer 2 mobility network (Integrated heterogeneous mobile wireless network)
3 Multicast delivery terminal
11 Gateway router (IP multicast router)
21 Gateway switch
31 Signaling server
61 to 64 Branch switched
71 to 74 Edge switches (Layer 2 switches)
81 to 84 Wireless base stations (cellular type)
91 to 94 Wireless base station (hotspot type)
101, 102 Mobile terminals

BEST MODE(S) FOR CARRYING OUT THE INVENTION

Exemplary embodiments of a layer 2 mobility network according to the present invention are explained in detail below with reference to the accompanying drawings.

First Embodiment

FIG. 1 is a conceptual diagram of a structure of a layer 2 mobility network as an integrated heterogeneous mobile wireless network according to a first embodiment of the present invention. In FIG. 1, an external network 1 is, for example, the Internet or an intranet. A layer 2 mobility network 2 is connected to the external network 1. The layer 2 mobility network 2 is a heterogeneous radio integrated network in which heterogeneous wireless access systems are integrated in a layer 2 base. A multicast delivery terminal 3 is connected to the external network 1. The multicast delivery terminal 3 is a terminal serving as a source (a transmission source) of multicast communication to a mobile terminal, which makes connection to the layer 2 mobility network 2, and can provide contents such as streaming data.

The layer 2 mobility network 2 includes a gateway router 11 connected to the external network 1. The gateway router 11 is an IP multicast router that performs mutual connection (routing) in an IP (Internet Protocol) layer with the external network 1 and terminates a multicast function of IPv4/IPv6. A gateway switch 21 is connected under the gateway router 11. The gateway switch 21 has a function of managing positional information of all mobile terminals in the layer 2 mobility network 2.

A signaling server 31 is connected to the gateway switch 21. Branch switches 61 to 64 that relay and transfer a layer 2 frame are arranged between the gateway switch 21 and edge switches (layer 2 switches) 71 to 74 to which the heterogeneous wireless access systems are subordinate.

The signaling server 31 has a function of applying handover control among the heterogeneous wireless access systems to a mobile terminal that moves in the layer 2 mobility network 2 and a function of acquiring layer 2 trigger information (a radio quality measurement result, etc.) serving as a material for judgment in executing the handover control from the mobile terminal and instructing the mobile terminal to switch a radio interface.

Wireless base stations 81 to 84 and 91 to 94 corresponding to the respective wireless access systems are subordinate to the edge switches 71 to 74. The wireless base stations 81 to 84 are, for example, wireless base stations in a cellular type system. The wireless base stations 91 to 94 are, for example, wireless base stations in a hotspot type system. Mobile terminals 101 and 102 make wireless connection to such heterogeneous wireless access systems and perform multicast communication.

In FIG. 1, the wireless base stations 81 and 91 are connected to the edge switch 71 and the wireless base stations 82 and 92 are connected to the edge switch 72. The edge switches 71 and 72 are connected to the gateway switch 21 via the branch switches 63 and 61. The wireless base stations 83 and 93 are connected to the edge switch 73 and the wireless base stations 84 and 94 are connected to the edge switch 74. The edge switches 73 and 74 are connected to the gateway switch 21 via the branch switches 64 and 62.

In this first embodiment and embodiments explained after the first embodiment, a control operation for multicast communication according to the present invention is realized using the layer 2 mobility network 2 having the structure shown in FIG. 1.

In the first embodiment, as functions in carrying out multicast delivery to the mobile terminals, apparatuses located at the edges of a network such as the edge switches 71 to 74, which are the layer 2 switches, or the wireless base stations 81 to 84 and 91 to 94, which are the radio access points, have a function of transmitting a report message in a multicast procedure "IGMP (Internet Group Management Protocol)/MLD (Multicast Listener Discovery)" transmitted from the mobile terminals to the gateway switch 21 and snooping the report message to learn a transfer route for multicast and a function of transmitting an entry update request frame for causing the switches to learn an entry forming the learned transfer route for multicast in a direction of the gateway switch 21.

The gateway switch 21 has a function of transferring, after the transfer route for multicast is created, the received IGMP/MLD report message to a port to which the gateway router 11, which is an IP multicast router, is connected. A control operation for multicast communication according to the first embodiment is explained below referring to FIG. 2.

Figure 2:
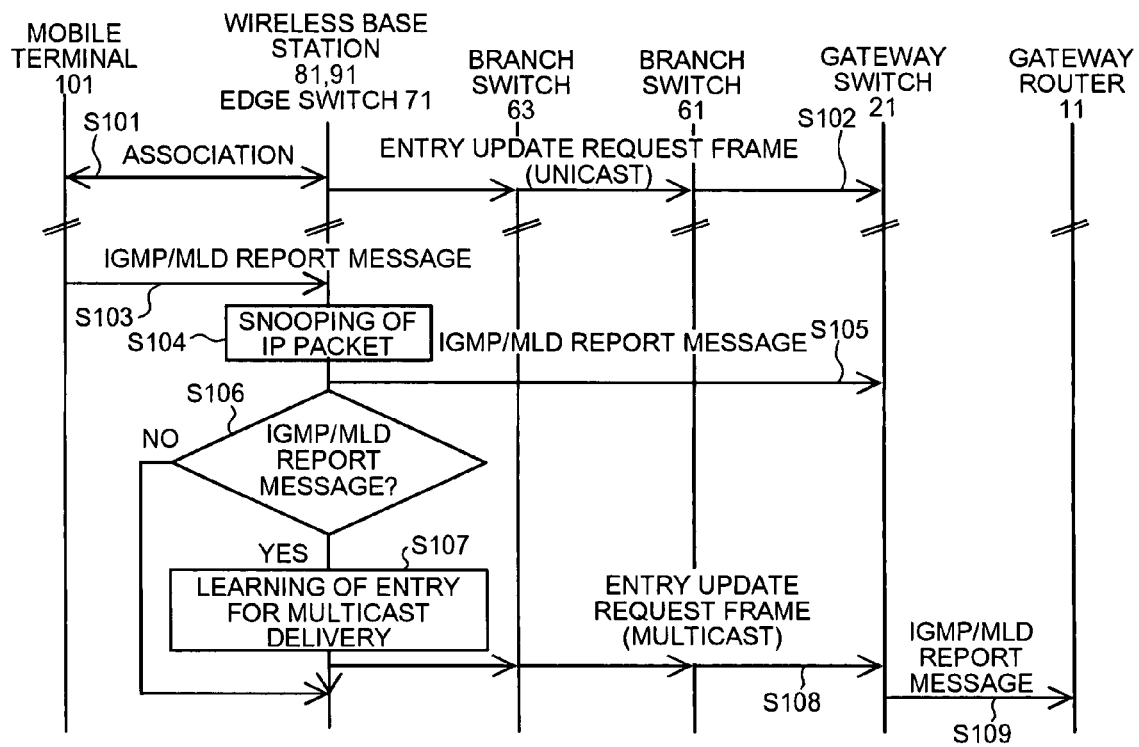
FIG. 2 is a sequence chart for explaining a control operation for multicast communication carried out in the layer 2 mobility network shown in FIG. 1.

FIG. 2 is a sequence chart for explaining a control operation for multicast communication carried out in the layer 2 mobility network shown in FIG. 1. In FIG. 2, to make wireless connection to the wireless base station 81 or the wireless base station 91 and start communication, the mobile terminal 101 sets association (Association) with the wireless base station 81 or 91/the edge switch 71 (S101). This association (Association) is a context for communication. For example, the association is PDP-Context in the case of the 3G cellular and is Association of the IEEE802.11 in the case of the wireless LAN.

The wireless base station 81 or 91/the edge switch 71 transmits, with the setting of this association (Association) as a trigger, an entry update request frame (Update Entry Request for Unicast) for causing the respective switches to learn an entry forming a transfer route of unicast to the mobile terminal 101 in the direction of the gateway switch 21. The branch switches 61 and 63 and the gateway switch 21 present on the transfer route to the mobile terminal 101 receive this entry update request frame (Update Entry Request for Unicast) to thereby learn the entry forming a transfer route of unicast to the mobile terminal 101 (S102).

The mobile terminal 101 transmits, to request multicast delivery, an IGMP/MLD report message to the gateway router 11 that supports the multicast delivery (S103). The IGMP/MLD report message is IGMP Membership Report in the case of IPv4 and is MLD Listener Report in the case of IPv6.

The wireless base station 81 or 91/the edge switch 71 snoops an IP packet including the IGMP/MLD report message transmitted from the mobile terminal 101 (S104), then, transfers the IP packet in the direction of the gateway switch 21 (S105), and judges whether the snooped IP packet is the IGMP/MLD report message (S106).

When the snooped IP packet is the IGMP/MLD report message (S106: Yes) as a result of the judgment, the wireless base station 81 or 91/the edge switch 71 learns the entry for multicast delivery (S107) and transmits an entry update request frame (Update Entry Request for Multicast) for causing the respective switches to learn an entry forming a transfer route of multicast to the mobile terminal 101 in the direction of the gateway switch 21 (S108). The branch switches 61 and 63 and the gateway switch 21 present on the transfer route to the mobile terminal 101 receive this entry update request frame (S108) to thereby learn the entry forming a transfer route of multicast to the mobile terminal 101.

When the gateway switch 21 confirms the reception of the IGMP/MLD report message (S105) out of various IP packets transferred from the wireless base station 81 or 91/the edge switch 71, after receiving the entry update request frame (S108), the gateway switch 21 transfers the IGMP/MLD report message (S105) received earlier to the gateway router 11 (S109). The gateway router 11 receives the IGMP/MLD report message to thereby recognize the presence of the mobile terminal 101 that requests multicast delivery and start the distribution of content data such as streaming data transmitted from the multicast delivery terminal 3.

As described above, according to the first embodiment, the apparatus located at the edge of the network snoops the IGMP/MLD report message transmitted from the mobile terminal in the process of relaying and transferring the IGMP/MLb report message in the direction of the gateway and learns the transfer route for multicast. The apparatus transmits the entry update request frame for causing the switches to learn the entry forming the learned transfer route for multicast in the direction of the gateway switch. Thus, the respective branch switches and the gateway switch present on a route to the gateway switch can learn the entry forming the transfer route for multicast and establish a route for IP multicast delivery to the mobile terminal.

The gateway switch can confirm, by receiving the entry update request frame from the branch switches, that the transfer route for multicast is created. Thus, the gateway switch can transfer the IGMP/MLD report message received earlier to the port to which the IP multicast router (the gateway router 11) is connected with the reception of the entry update request frame from the branch switches as a trigger. Thus, it is possible to start the multicast delivery within a relatively short time.

Second Embodiment

In this second embodiment, as functions in carrying out multicast delivery to mobile terminals, apparatuses located at the edges of a network such as the edge switches 71 to 74, which are the layer 2 switches, or the wireless base station 81 to 84 and 91 to 94, which are the radio access points, have a function of managing a multicast delivery status for each of the mobile terminals in addition to the functions explained in the first embodiment. Further, the apparatuses have a function of checking, when report messages of the multicast procedure "IGMP/MLD" are received from a plurality of mobile terminals, whether the same multicast group and the same distribution source have already been requested referring to a management table for managing the multicast delivery status for each of the mobile terminals rather than immediately transferring the report message to the gateway router 11, which is an IP multicast router. The apparatuses perform the operations explained in the first embodiment only when, as a result of the check, the same multicast group and the same distribution source have not been requested. The gateway switch 21 has the functions explained in the first embodiment. A control operation for multicast communication according to the second embodiment is explained below referring to FIG. 3.

Figure 3:
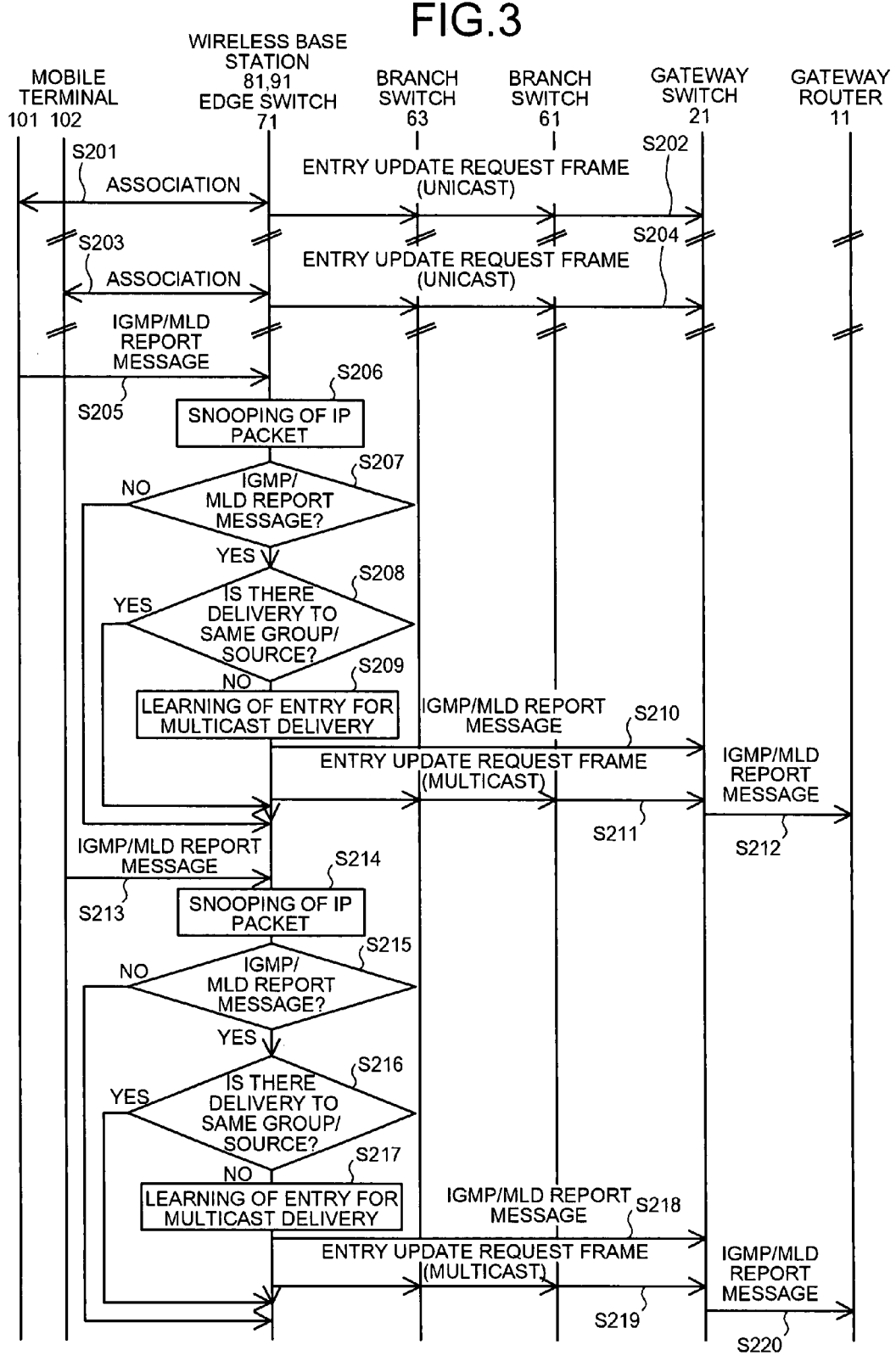
FIG. 3 is a sequence chart for explaining, as a second embodiment of the present invention, a control operation for multicast communication carried out in the layer 2 mobility network shown in FIG. 1.

FIG. 3 is a sequence chart for explaining, as the second embodiment of the present invention, a control operation for multicast communication carried out in the layer 2 mobility network shown in FIG. 1. In FIG. 3, the mobile terminals 101 and 102 make wireless connection to the wireless base station 81 or the wireless base station 91 subordinate to the edge switch 71. Because the same control operations are applied to the mobile terminals 101 and 102, the control operations are explained in parallel.

In FIG. 3, to make wireless connection to the wireless base station 81 or the wireless base station 91 and start communication, the mobile terminals 101 and 102 set association (Association) with the wireless base station 81 or 91/the edge switch 71 (S201 and S203). This association (Association) is a context for communication. For example, the association is PDP-Context in the case of the 3G cellular and is Association of the IEEE802.11 in the case of the wireless LAN.

The wireless base station 81 or 91/the edge switch 71 transmits, with the setting of this association (Association) as a trigger, an entry update request frame (Update Entry Request for Unicast) for causing the respective switches to learn an entry forming transfer routes of unicast to the mobile terminals 101 and 102 in the direction of the gateway switch 21 (S202 and S204). The branch switches 61 and 63 and the gateway switch 21 present on the transfer routes to the mobile terminals 101 and 102 receive this entry update request frame (S202 and S204) to thereby learn the entry forming transfer routes of unicast to the mobile terminals 101 and 102.

In a process of transmitting various IP packets, the mobile terminals 101 and 102 transmit, to request multicast delivery, IGMP/MLD report messages to the gateway router 11 that supports the multicast delivery (S205 and S213). The IGMP/MLD report messages are IGMP Membership Report in the case of IPv4 and are MLD Listener Report in the case of IPv6.

The wireless base station 81 or 91/the edge switch 71 snoops IP packets transmitted from the mobile terminals 101 and 102 (S206 and S214) and judges whether the snooped IP packets are the IGMP/MLD report messages (S207 and S125). As a result, when the IP packets are not the IGMP/MLD report messages (S207: No and S215: No), the wireless base station 81 or 91/the edge switch 71 shifts to other processing. However, when the IP packets are the IGMP/MLD report messages (S207: Yes and S215: Yes), the wireless base station 81 or 91/the edge switch 71 checks whether an entry for transfer to a group/source, distribution to which is requested, is present referring to a table for managing a multicast delivery status for each of the mobile terminals rather than immediately relaying and transferring the IP packets in the direction of the gateway router 11 (S208 and S216).

When the entry for transfer to the group/source, distribution to which is requested, is present (S208: Yes and S216: Yes), the wireless base station 81 or 91/the edge switch 71 shifts to other processing. However, when the entry is not present (S208: No and S216: No), the wireless base station 81 or 91/the edge switch 71 learns an entry forming transfer routes to a multicast group including the mobile terminals 101 and 102 (S209 and S217). Thereafter, the wireless base station 81 or 91/the edge switch 71 transfers the IGMP/MLD report messages (S205 and S123) transmitted from the mobile terminals 101 and 102 in the direction of the gateway router 11 to the gateway switch 21 (S210 and S218). The wireless base station 81 or 91/the edge switch 71 transmits an entry update request frame (Update Entry Request for Multicast) for causing the branch switches 63 and 61 and the gateway switch 21 to learn an entry forming transfer paths of multicast including the mobile terminals 101 and 102 in the direction of the gateway switch 21 (S211 and S219).

When the gateway switch 21 confirms the reception of the IGMP/MLD report messages (S210 and S218) transferred from the wireless base station 81 or 91/the edge switch 71, after receiving the entry update request frames (S211 and S219), the gateway switch 21 transfers IGMP/MLD report messages received earlier to the gateway router 11 (S212 and S220). The gateway router 11 receives the IGMP/MLD report messages to thereby recognize the presence of the mobile terminals 101 and 102 that are requesting multicast delivery and start the distribution of content data such as streaming data transmitted from the multicast delivery terminal 3.

As described above, according to the second embodiment, the apparatus located at the edge of the network manages a multicast delivery status for each of the mobile terminals and, before transferring IGMP/MLD report messages transmitted from a plurality of mobile terminals to the IP multicast router, checks whether the same multicast group and the same distribution source have already been requested. When the same multicast group and the same distribution source have not been requested, the apparatus learns a transfer route for multicast and performs the transfer of the IGMP/MLD report messages and the transmission of an entry update request frame for causing the switches to learn an entry forming the learned transfer route for multicast. Thus, even if the branch switches and the gateway switch are not implemented with the function of snooping the IGMP/MLD report messages, the branch switches and the gateway switch can establish a route for IP multicast delivery to the mobile terminals. In addition, even if requests for multicast delivery are received from a plurality of mobile terminals, because the apparatus located at the edge of the network stops unnecessary transfer, it is possible to reduce control traffic of a multicast procedure related to the establishment of a route for IP multicast delivery. Therefore, it is possible to establish a integrated heterogeneous mobile wireless network excellent is scalability.

Third Embodiment

In this third embodiment, as functions at the time when a mobile terminal that has been receiving multicast delivery leaves the multicast group, apparatuses located at the edges of a network such as the edge switches 71 to 74, which are the layer 2 switches, or the wireless base stations 81 to 84 and 91 to 94, which are the radio access points, have a function of snooping a leave message in the multicast procedure "IGMP/MLD" from the mobile terminal in a process of transferring the leave message to the gateway router 11, which is the IP multicast router, and confirming that an IGMP/MLD report message responding to an IGMP/MLD query message from the gateway router 11 is transmitted from the mobile terminal, a function of transmitting, when the IGMP/MLD report message is not transmitted from the mobile terminal in a fixed time, an entry deletion request frame for deleting the entry forming a transfer route for multicast in the direction of the gateway switch 21, and a function of learning a transfer route for multicast again when the IGMP/MLD report message is transmitted from the mobile terminal in the fixed time and transmitting an entry update request frame for causing the switches to learn an entry forming the learned transfer route for multicast in the direction of the gateway switch. A control operation for multicast communication according to the third embodiment is explained below referring to FIG. 4.

Figure 4:
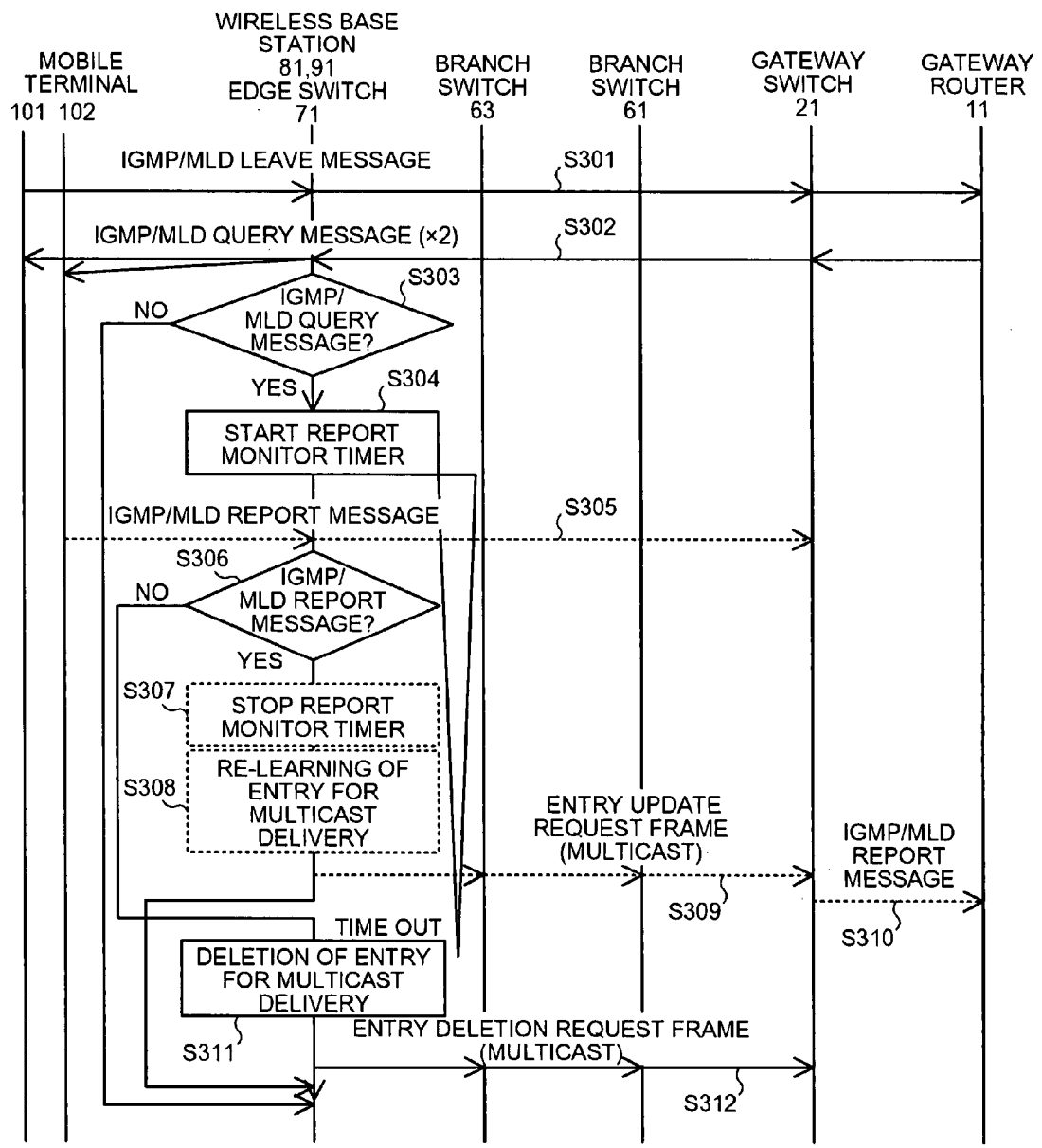
FIG. 4 is a sequence chart for explaining, as a third embodiment of the present invention, a control operation for multicast communication carried out in the layer 2 mobility network shown in FIG. 1.

FIG. 4 is a sequence chart for explaining, as the third embodiment of the present invention, a control operation for multicast communication carried out in the layer 2 mobility network shown in FIG. 1. In FIG. 4, when the mobile terminals 101 and 102 are receiving multicast delivery via the wireless base station 81 or the wireless base station 91 subordinate to the edge switch 71, a mobile terminal leaves the multicast group.

In FIG. 4, the mobile terminal 101 transmits, to leaves the multicast group, an IGMP/MLD leave message to the gateway router 11, which supports the multicast delivery, through the gateway switch 21 (S301). In that case, the wireless base station 81 or 91/the edge switch 71 snoops the IGMP/MLD leave message, which the wireless base station 81 or 91/the edge switch 71 relays and transfers, and waits for an IGMP/MLD query message transmitted from the gateway router 11 (S303). The IGMP/MLD leave message is IGMP Membership Leave in the case of IPv4 and is MLD Listener Done in the case of IPv6.

When the gateway router 11 receives the IGMP/MLD leave message, to check whether other mobile terminals that request distribution remain, the gateway router 11 transmits an IGMP/MLD query message, which targets notified multicast group/source, to the wireless base station 81 or 91/the edge switch 71 through the gateway switch 21 (S302). The IGMP/MLD query message is IGMP membership Query in the case of IPv4 and is MLD Listener Query in the case of IPv6.

The wireless base station 81 or 91/the edge switch 71 snoops the IGMP/MLD query message transmitted from the gateway router 11 and checks whether the message is an IGMP/MLD query message (S303). Because the IGMP/MLD query message is transmitted a plurality of number of times (twice in default), the wireless base station 81 or 91/the edge switch 71 performs the check according to the number of times set by the gateway router 11.

When the IGMP/MLD query message is transmitted the set number of times, the wireless base station 81 or 91/the edge switch 71 recognizes that the IGMP/MLD query message is transmitted (S303: Yes), starts a report monitor timer (S304), and monitors whether an IGMP/MLD report message (S305), which targets the multicast group/source designated by the query message, is transmitted from another mobile terminal (in the present example, the mobile terminal 102) (S306). When the wireless base station 81 or 91/the edge switch 71 cannot recognize that the IGMP/MLD query message is transmitted (S303: No), the wireless base station 81 or 91/the edge switch 71 performs other processing.

When the IGMP/MLD report message is not transmitted from another mobile terminal before the report monitor timer times out or when, as a result of snooping a transmitted IP packet, the IP packet is not the IGMP/MLD report message (S306: No), the wireless base station 81 or 91/the edge switch 71 deletes an entry forming a transfer route for multicast designated by the query message (S311).

To cause the branch switches 63 and 61 and the gateway switch 21 to delete the entry forming the transfer route for multicast, the wireless base station 81 or 91/the edge switch 71 transits an entry deletion request frame (Cancel Entry Request for Multicast) in the direction of the gateway switch 21 (S312).

On the other hand, when the IGMP/MLD report message is transmitted from another mobile terminal before the timeout of the report monitor timer or when, as a result of snooping the transmitted IP packet, the IP packet is the IGMP/MLD report message (S306: Yes), the wireless base station 81 or 91/the edge switch 71 stops the report monitor timer (S307).

Thereafter, the wireless base station 81 or 91/the edge switch 71 learns the entry to be transferred to the multicast group again (S308) and transmits an entry update request frame (Update Entry Request for Multicast) in the direction of the gateway switch 21 to cause the branch switches 63 and 61 and the gateway switch 21 to learn an entry forming a transfer route for multicast including the mobile terminal 101 (S309).

The gateway switch 21 transfers the IGMP/MLD report message (S305) transferred from the wireless base station 81 or 91/the edge switch 71 to the gateway router 11 after the reception of the entry update request frame (S309) (S310).

Consequently, when the mobile terminal 101 leaves, when another terminal mobile terminal such as the mobile terminal 102 does not respond to the IGMP/MLD query message transmitted by the gateway router 11, which is the IP multicast router, a route for IP multicast delivery to the mobile terminal 101 is deleted. On the other hand, when another mobile terminal responds, a route for IP multicast delivery to the other mobile terminal is formed anew.

As described above, according to the third embodiment, when a mobile terminal that has been receiving multicast delivery leaves the multicast group, the apparatus located at the edge of the network snoops the IGMP/MLD leave message from the mobile terminal when the message is transferred to the IP multicast router (the gateway router 11). The apparatus monitors the IGMP/MLD report message responding to the IGMP/MLD query message from the IP multicast router transmitted in the fixed time. When the IGMP/MLD report message is not transmitted from the mobile terminal in the fixed time, the apparatus transmits the entry deletion request frame for deleting the entry forming a transfer route for multicast in the direction of the gateway switch. When the IGMP/MLD report message is transmitted from the mobile terminal in the fixed time, the apparatus learns a transfer route for multicast again and transmits the entry update request frame for causing the switches to learn the transfer of the IGMP/MLD report message and an entry forming the learned transfer route for multicast in the direction of the gateway switch. Thus, even if the respective branch switches and the gateway switch are not implemented with the function of snooping the IGMP/MLD leave message, the branch switches and the gateway switch can delete a route for IP multicast delivery to the mobile terminal that has left the multicast delivery. When other mobile terminals that request multicast delivery remain even if a request for leave from the multicast delivery is received from the mobile terminal, even if the respective branch switches and the gateway switch are not implemented with the function of snooping the IGMP/

MLD report message, the branch switches and the gateway switch can establish a route for IP multicast delivery to the other mobile terminals.

Fourth Embodiment

In this fourth embodiment, as functions at the time when a mobile terminal that has been receiving multicast delivery leaves the multicast group, apparatuses located at the edges of a network such as the edge switches 71 to 74, which are the layer 2 switches, or the wireless base stations 81 to 84 and 91 to 94, which are the radio access points, have a function of managing a multicast delivery status for each of mobile terminals and also have a function of checking, when a leave message in the multicast procedure "IGMP/MLD" from the mobile terminal is received, whether terminals that request distribution of multicast by the same multicast group and the same distribution source remain referring to a management table rather than immediately transferring the leave message to the gateway router 11, which is the IP multicast router, and a function of transferring, when no such terminal remains, the leave message from the mobile terminal to the gateway switch 21 and transmitting an entry deletion request frame for deleting an entry forming the transfer route for multicast in the direction of the gateway switch 21.

The gateway switch 21 has a function of transferring, after a transfer route for multicast is deleted, the received leave message to a port to which the gateway router 11, which is the IP multicast router, is connected. A control operation for multicast communication according to the fourth embodiment is explained referring to FIG. 5.

Figure 5:
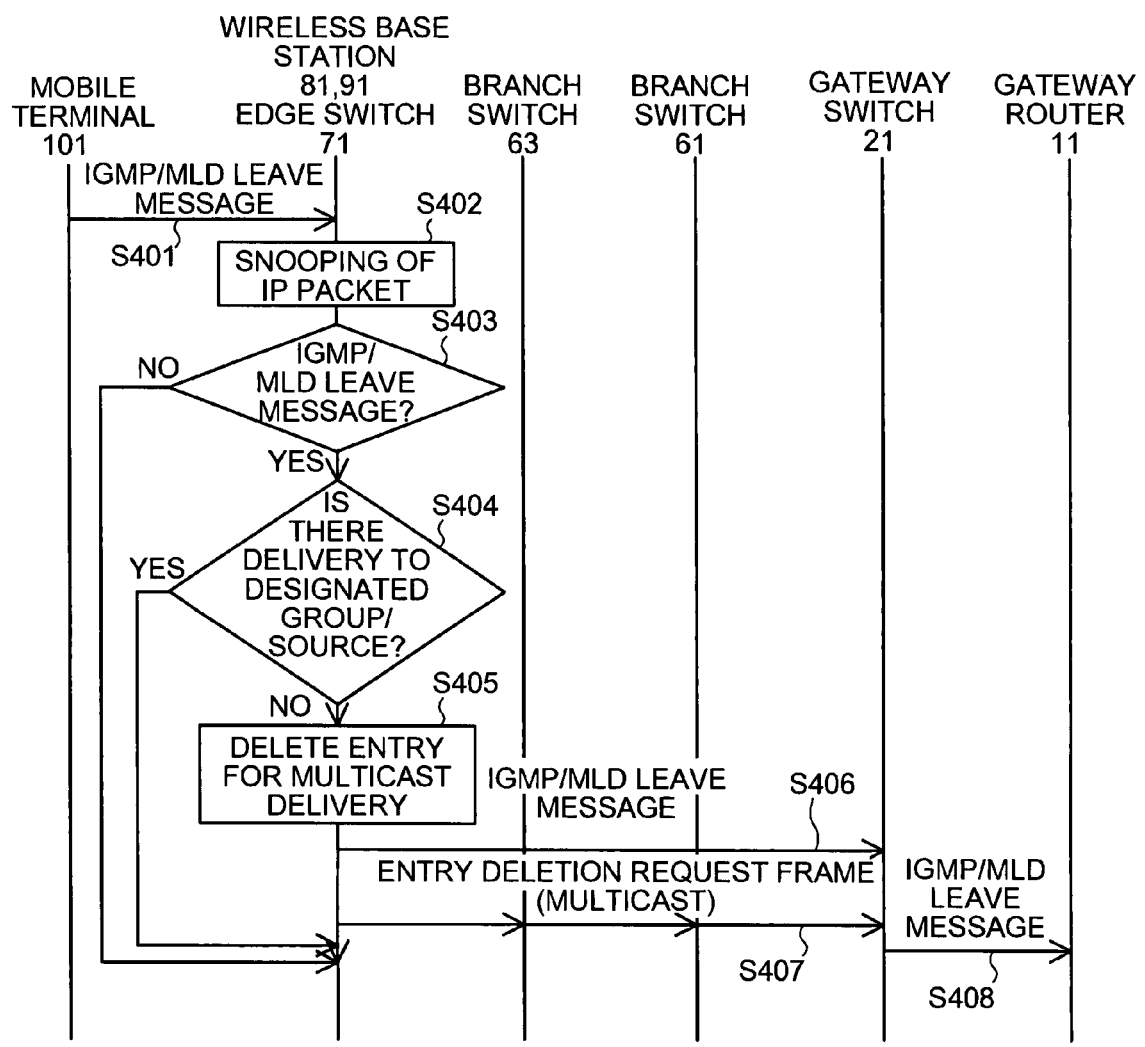
FIG. 5 is a sequence chart for explaining, as a fourth embodiment of the present invention, a control operation for multicast communication carried out in the layer 2 mobility network shown in FIG. 1.

FIG. 5 is a sequence chart for explaining, as the fourth embodiment of the present invention, a control operation for multicast communication carried out in the layer 2 mobility network shown in FIG. 1. In FIG. 5, in a process of transmitting various IP packets, the mobile terminal 101 transmits, to leave multicast communication, an IGMP/MLD leave message to the gateway router 11 that supports the multicast communication (S401). The IGMP/MLD leave message is IGMP Membership Leave in the case of IPv4 and is MLD Listener Done in the case of IPv6.

The wireless base station 81 or 91/the edge switch 71 snoops an IP packet from the mobile terminal 101 (S402) and checks whether the IP packet is an IGMP/MLD leave message (S403). When the IP packet is not the IGMP/MLD leave message (S403: No), the wireless base station 81 or 91/the edge switch 71 shifts to other processing. However, when the IP packet is the IGMP/MLD leave message (S403: Yes), the wireless base station 81 or 91/the edge switch 71 checks whether other mobile terminals that transmit distribution requests to a group/source, leave from which is requested, remain referring to a table for managing a multicast delivery status for each of mobile terminals (S404).

As a result, when such mobile terminals remain (S404: Yes), the wireless base station 81 or 91/the edge switch 71 shifts to other processing. However, when no such mobile terminal remains (S404: No), the wireless base station 81 or 91/the edge switch 71 deletes an entry to be transferred to a multicast group, leave from which is requested (S405). The wireless base station 81 or 91/the edge switch 71 transfers the IGMP/MLD leave message (S401) transmitted from the mobile terminal 101 in the direction of the gateway router 11 to the gateway switch 21 (S406). The wireless base station 81 or 91/the edge switch 71 transmits an entry deletion request frame (Cancel Entry Request for Multicast) for causing the branch switches 63 and 61 and the gateway switch 21 to delete an entry forming a transfer route for multicast including the mobile terminal 101 in the direction of the gateway switch 21 (S407).

When the gateway switch 21 confirms the reception of the IGMP/MLD leave message (S406) transferred from the wireless base station 81 or 91/the edge switch 71, the gateway switch 21 transfers the IGMP/MLD leave message to the gateway router 11 after the reception of the entry deletion request frame (S407) (S408).

The gateway router 11 receives the IGMP/MLD leave message to thereby recognize that the mobile terminal that requests multicast delivery is not present and stop the distribution of content data such as streaming data transmitted from the multicast delivery terminal 3.

As described above, according to the fourth embodiment, when the mobile terminal that has been receiving multicast delivery leaves the multicast group, the apparatus located at the edge of the network manages a multicast delivery status for each of the mobile terminals and, before transferring the IGMP/MLD leave message from mobile terminal to the IP multicast router (the gateway router 11), checks whether mobile terminals that request the distribution of multicast of the same multicast group and the same distribution source remain. Only when no such mobile terminal remains, the apparatus performs the transfer of the IGMP/MLD leave message and the transmission of the entry deletion request frame for deleting an entry forming a transfer route for multicast. Thus, even if the respective branch switches and the gateway switch are not implemented with the function of snooping the IGMP/MLD leave message, the branch switches and the gateway switch can delete a route for IP multicast delivery to the mobile terminal that has left the multicast delivery. In addition, even if there are leave requests from a plurality of mobile terminals, because the apparatus located at the edge of the network stops unnecessary transfer, it is possible to reduce control traffic of a multicast procedure related to the deletion of the route for the IP multicast delivery. Therefore, it is possible to establish a integrated heterogeneous mobile wireless network excellent in scalability.

Fifth Embodiment

In this fifth embodiment, as functions for coping with requests for multicast delivery to the same distribution source by a plurality of mobile terminals belonging to the same multicast group, the gateway switch 21 has a function of performing filtering for not relaying and transferring a query message in the multicast procedure "IGMP/MLD" from the gateway router 11, which is the IP multicast router, into the network. Apparatuses located at the edges of a network such as the edge switches 71 to 74, which are the layer 2 switches, or the wireless base stations 81 to 84 and 91 to 94, which are the radio access points, have a function of managing a multicast delivery status for each of mobile terminals and transmitting, on behalf of the IP multicast router (the gateway router 11), an IGMP/MLD query message to the mobile terminals subordinate to the gateway router 11 and a function of treating, when IGMP/MLD report messages are sent from a plurality of mobile terminals belonging to the same multicast group to the same distribution source, requests from the mobile terminals as one request and transmitting the IGMP/MLD report messages to the IP multicast router when there is no entry to be transferred to a group/source, which is requested perform distribution. A control operation for multicast communication according to the fifth embodiment is explained below referring to FIG. 6.

Figure 6:
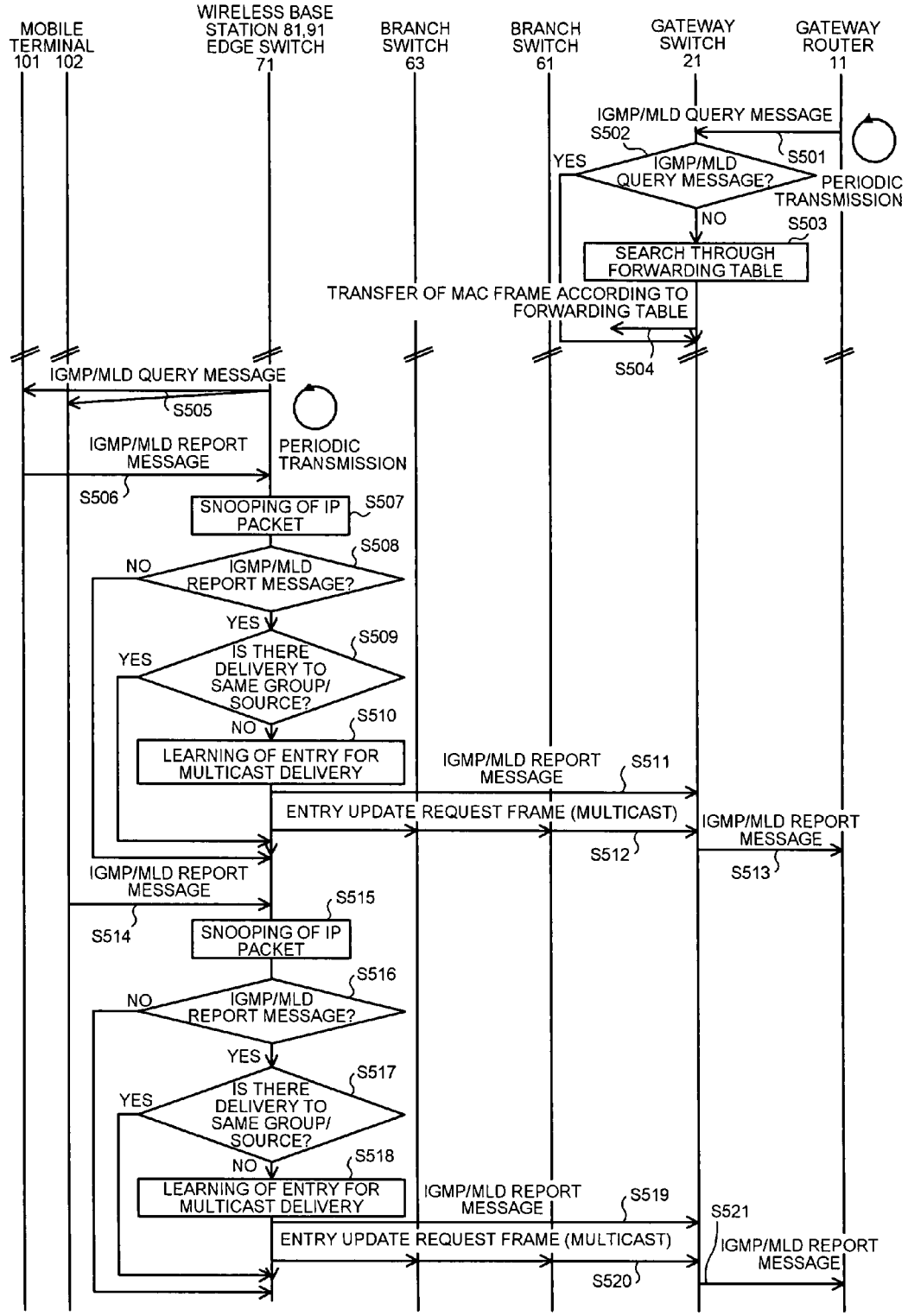
FIG. 6 is a sequence chart for explaining, as a fifth embodiment of the present invention, a control operation for multicast communication carried out in the layer 2 mobility network shown in FIG. 1.

FIG. 6 is a sequence chart for explaining, as the fifth embodiment of the present invention, a control operation for multicast communication carried out in the layer 2 mobility network shown in FIG. 1. In FIG. 6, the mobile terminals 101 and 102 are radio-connected to the wireless base station 81 or the wireless base station 91 subordinate to the edge switch 71.

In FIG. 6, the gateway router 11 that supports multicasts distribution periodically transmits an IGMP/MLD query message in a direction of mobile terminals to check the necessity of requested distribution to a multicast group/source (S501). The IGMP/MLD query message is IGMP Membership Query in IPv4 and is MLD Listener Query in IPv6.

The gateway switch 21 that first receives a message transmitted by the gateway router 11 in the direction of the mobile terminals checks whether the received message is the IGMP/MLD query message (S502). When the message is the IGMP/MLD query message (S502: Yes), the gateway switch 21 discards the query message without transferring the query message to the mobile terminal side. On the other hand, when the message is not the query message (S502: No), the gateway switch 21 searches through a forwarding table (S503) and transfers an MAC (Media Access Control) frame to the mobile terminal side according to the forwarding table (S504). In this way, the gateway switch 21 filters the IGMP/MLD query message from the gateway router 11.

On the other hand, the wireless base station 81 or 91/the edge switch 71 periodically transmits, on behalf of the gateway router 11, the IGMP/MLD query message to the mobile terminals 101 and 102 and the like subordinate to the gateway router 11 to check the necessity of requested distribution to the multicast group/source (S505). Thereafter, because the same control operations are applied to IGMP/MLD report messages transmitted from the mobile terminals 101 and 102, the control operations are explained in parallel.

The mobile terminals 101 and 102 transmit in a wireless manner, in a process for transmitting and receiving various packets, the IGMP/MLD report messages to the gateway router 11 as a response to the received IGMP/MLD query message (S506 and S514).

The wireless base station 81 or 91/the edge switch 71 snoops IP packets transmitted from the mobile terminals 101 and 102 (S507 and S515) and judges whether the IP packets are IGMP/MLD report messages (S508 and S516). As a result, when the IP packets are not the IGMP/MLD report messages (S508: No and S516: No), the wireless base station 81 or 91/the edge switch 71 shifts to other processing. However, when the IP packets are the IGMP/MLD report messages (S508: Yes and S516: Yes), the wireless base station 81 or 91/the edge switch 71 further checks whether an entry for transfer to the group/source, distribution to which is requested, is present referring to a table for managing a multicast delivery status for each of the mobile terminals rather than immediately relaying and transferring the IGMP/MLD report messages in the direction of the gateway router 11 (S509 and S517).

When the entry for transfer to the group/source, distribution to which is requested, is present (S509: Yes and S517: Yes), the wireless base station 81 or 91/the edge switch 71 shifts to other processing. However, when the entry is not present (S509: No and S517: No), the wireless base station 81 or 91/the edge switch 71 learns an entry forming a transfer route to the multicast group including the mobile terminals 101 and 102 (S510 and S518). Thereafter, the wireless base station 81 or 91/the edge switch 71 transfers the IGMP/MLD report messages (S506 and S514), which are transmitted from the mobile terminals 101 and 102 in the direction of the gateway router 11, to the gateway switch 21 (S511 and S519).

The wireless base station 81 or 91/the edge switch 71 transmits an entry update request frame (Update Entry Request for Multicast) for causing the branch switches 63 and 61 and the gateway switch 21 to learn the entry forming the transfer route for multicast including the mobile terminals 101 and 102 in the direction of the gateway switch 21 (S512 and S520).

When the gateway switch 21 confirms the reception of the IGMP/MLD report messages (S511 and S519) transferred from the wireless base station 81 or 91/the edge switch 71, after receiving the entry update request frames (S512 and S520), the gateway switch 21 transfers the IGMP/MLD report messages received earlier to the gateway router 11 (S513 and S521). The gateway router 11 receives the IGMP/MLD report messages to thereby recognize the presence of the mobile terminals 101 and 102, which request the multicast delivery, and start the distribution of content data such as streaming data transmitted from the multicast delivery terminal 3.

As described above, according to the fifth embodiment, the gateway switch filters the IGMP/MLD query message from the IP multicast router. The apparatus located at the edge of the network manages a multicast delivery status for each of the mobile terminals and transmits, on behalf of the IP multicast router, the IGMP/MLD query message to the respective mobile terminals. The IGMP/MLD report messages are transmitted from a plurality of mobile terminals belonging to the same multicast group to the same distribution source. In this case, only when an entry for transfer to the group/source, distribution to which is requested, is not present, the IGMP/MLD report messages are transmitted to the IP multicast router. Thus, it is possible to reduce control traffic of a multicast procedure related to maintenance of an IP multicast delivery route to the mobile terminals. Therefore, it is possible to establish a integrated heterogeneous mobile wireless network excellent in scalability.

Sixth Embodiment

In this sixth embodiment, as functions of the gateway switch 21 for the request of and the leave from multicast delivery, in the second embodiment (FIG. 3) and the fourth embodiment (FIG. 5), the gateway switch 21 has a function of snooping a report message in the multicast procedure "IGMP/MLD" transmitted from an apparatus located at the edge of the network, registering a multicast group/source, distribution to which is requested, in a table for managing a multicast delivery status for each of mobile terminals, and transmitting the received IGMP/MLD report message to the IP multicast router (the gateway router 11) after receiving an entry update request frame transmitted after the IGMP/MLD report message, a function of transmitting, on behalf of the mobile terminals, the IGMP/MLD report message to the IP multicast router when the IGMP/MLD query message periodically transmitted by the IP multicast router is not transferred to the respective mobile terminals but is transferred to the multicast group/source, distribution to which is requested referring to the management table, a function of receiving an IGMP/MLD leave message transmitted from the apparatus located at the edge of the network, deleting a multicast group/source, leave from which is displayed, from the management table, and transmitting the received IGMP/MLD leave message to the IP multicast router after the reception of the entry deletion request frame transmitted after the IGMP/MLD leave message, and a function of not transmitting, on behalf of the mobile terminals, a report message in the multicast procedure to the IP multicast router when there is no mobile terminal that request multicast delivery referring to the management table. A control operation for multicast communication according to the sixth embodiment is explained below referring to FIG. 7.

Figure 7:
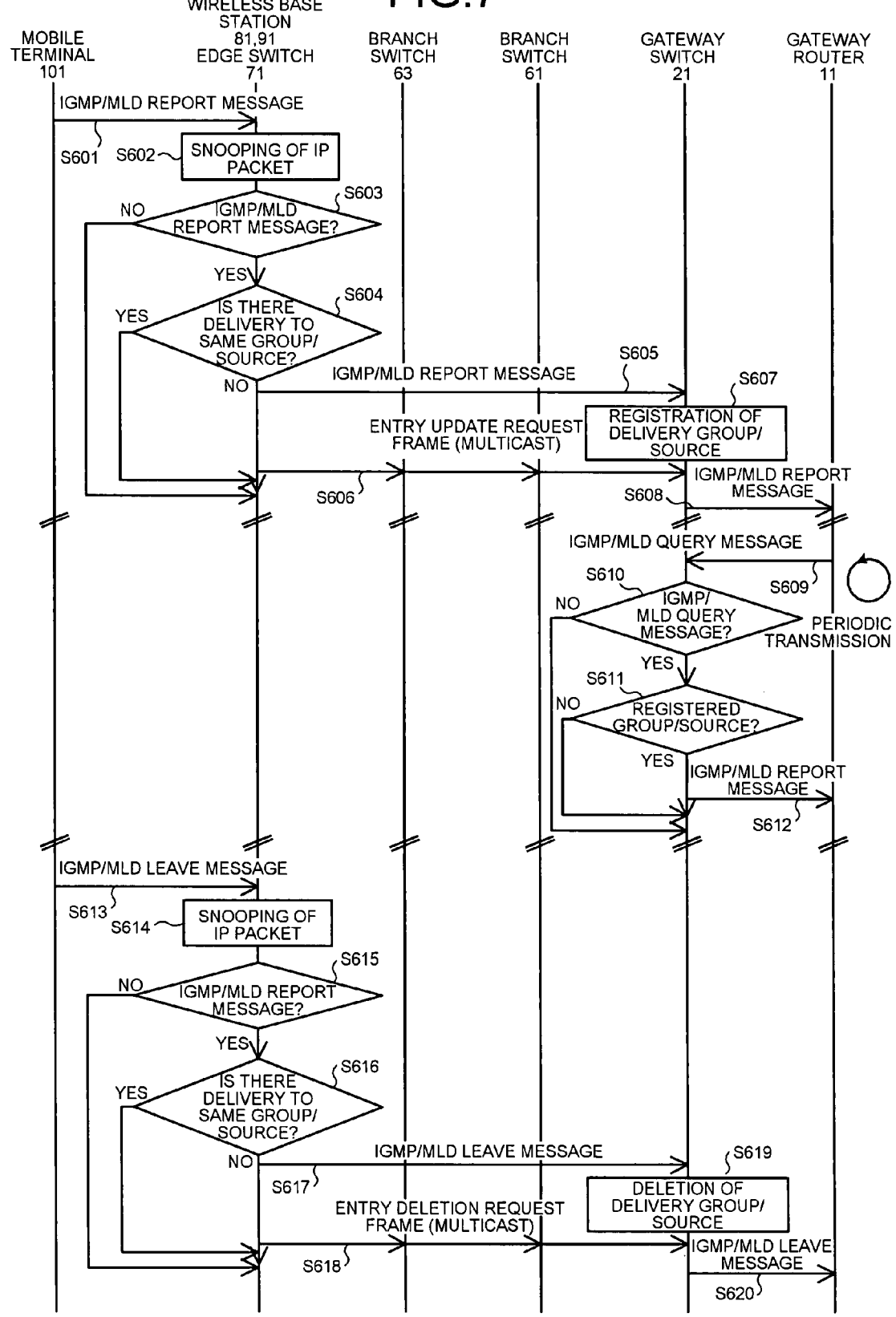
FIG. 7 is a sequence chart for explaining, as a sixth embodiment of the present invention, a control operation for multicast communication carried out in the layer 2 mobility network shown in FIG. 1.

FIG. 7 is a sequence chart for explaining, as the sixth embodiment of the present invention, a control operation for multicast communication carried out in the layer 2 mobility network shown in FIG. 1. In FIG. 7, in a process of transmitting various IP packets, the mobile terminal 101 transmits, to request multicast delivery, an IGMP/MLD report message to the gateway router 11 that supports the multicast delivery (S601). The IGMP/MLD report message is IGMP Membership Report in the case of IPv4 and is MLD Listener Report in the case of IPv6.

The wireless base station 81 or 91/the edge switch 71 snoops an IP packet transmitted from the mobile terminal 101 (S602) and judges whether the IP packet is an IGMP/MLD report message (S603). As a result, when the IP packet is not the IGMP/MLD report message (S603: No), the wireless base station 81 or 91/the edge switch 71 shifts to other processing. However, when the IP packet is the IGMP/MLD report message (S603: Yes), the wireless base station 81 or 91/the edge switch 71 further checks whether an entry for transfer to a group/source, distribution to which is requested, is present referring to a table for managing a multicast delivery status for each of the mobile terminals rather than immediately relaying and transferring the IGMP/MLD report message in the direction of the gateway router 11 (S604).

When the entry for the transfer to the group/source, distribution to which is requested, is present (S604: Yes), the wireless base station 81 or 91/the edge switch 71 shifts to other processing. However, when the entry is not present (S604: No), the wireless base station 81 or 91/the edge switch 71 learns an entry forming a transfer route to a multicast group including the mobile terminal 101 and transfers the IGMP/MLD report message (S601), which is transmitted from the mobile terminal 101 in the direction of the gateway router 11, to the gateway switch 21 (S605). The wireless base station 81 or 91/the edge switch 71 transmits an entry update request frame (Update Entry Request for Multicast) for causing the branch switches 63 and 61 and the gateway switch 21 to learn an entry forming a transfer route of multicast including the mobile terminal 101 in the direction of the gateway switch 21 (S606).

The gateway switch 21 receives the IGMP/MLD report message (S605) transferred from the wireless base station 81 or 91/the edge switch 71 and registers the multicast group/source, distribution to which is requested, in a table for managing a multicast delivery status for each of the mobile terminals (S607). After receiving the entry update request frame (S606), the gateway switch 21 transfers the IGMP/MLD report message (S605) received earlier to the gateway router 11 (S608).

The gateway router 11 that supports multicast delivery periodically transmits the IGMP/MLD query message in the direction of the mobile terminals to check the necessity of requested distribution to the multicast group/source (S609). The IGMP/MLD query message is IGMP Membership Query in IPV4 and is MLD Listener Query in IPv6.

The gateway switch 21 that first receives a message transmitted by the gateway router 11 in the direction of the mobile terminals checks whether the received message is the IGMP/MLD query message (S610). When the message is not the query message (S610: No), the gateway switch 21 shifts to other processing. However, when the received message is the query message (S610: Yes), the gateway switch 21 further checks the multicast group/source, distribution to which is requested, referring to the management table (S611).

When the gateway switch 21 judges, based on information registered in the management table, that the distribution to the multicast group/source is requested (S611: Yes), the gateway switch 21 transmits, on behalf of the mobile terminals, the IGMP/MLD report message to the gateway router 11 (S612). The IGMP/MLD report message transmitted here is IGMP Membership Report when the query message received at S610 is IGMP Membership Query. The IGMP/MLD report message is MLD Listener Report when the query message is MLD Listener Query.

On the other hand, when the gateway switch 21 judges, based on the information registered in the management table, that the deliver to the multicast group/source is not requested (S611: No), the gateway switch 21 does not transmit, on behalf of the mobile terminals, the IGMP/MLD report message to the gateway router 11 because no mobile terminal that request multicast delivery is present.

When the gateway router 11 receives the report message (S612) responding to the transmitted query message (S609), the gateway router 11 judges that the request for distribution to the corresponding multicast group/source is continuing and continuously performs distribution of content data such as streaming data transmitted from the multicast delivery terminal 3.

In a process of transmitting various IP packets, the mobile terminal 101 transmits, to leave the multicast delivery, an IGMP/MLD leave message to the gateway router 11 that supports the multicast delivery (S613). The IGMP/MLD leave message is IGMP Membership Leave in the case of IPv4 and is MLD Listener Done in the case of IPv6.

The wireless base station 81 or 91/the edge switch 71 snoops an IP packet from the mobile terminal 101 (S614) and checks whether the IP packet is an IGMP/MLD leave message (S615). As a result, when the IP packet is not the IGMP/MLD leave message (S615: No), the wireless base station 81 or 91/the edge switch 71 shifts to other processing. However, when the IP packet is the IGMP/MLD leave message (S615: Yes), the wireless base station 81 or 91/the edge switch 71 checks whether other mobile terminals that transmit a distribution request to a group/source, leave from which is requested, remain referring to a table for managing a multicast delivery status for each of the mobile terminals rather than immediately relaying and transferring the IGMP/MLD leave message from the mobile terminal 101 in the direction of the gateway router 11 (S616).

As a result, when such mobile terminals remain (S616: Yes), the wireless base station 81 or 91/the edge switch 71 shifts to other processing. However, when no such mobile terminal remains (S616: No), the wireless base station 81 or 91/the edge switch 71 deletes an entry to be transferred to the multicast group, leave from which is requested, and transfers the IGMP/MLD leave message (S613), which is transmitted from the mobile terminal 101 in the direction of the gateway router 11, to the gateway switch 21 (S617). The wireless base station 81 or 91/the edge switch 71 transmits an entry deletion request frame (Cancel Entry Request for Multicast) for causing the branch switches 63 and 61 and the gateway switch 21 to delete an entry forming a transfer route for multicast including the mobile terminal 101 in the direction of the gateway switch 21 (S618).

The gateway switch 21 receives the IGMP/MLD leave message (S613) transferred from the wireless base station 81 or 91/the edge switch 71, deletes the multicast group/source, leave from which is displayed (S619), and, after receiving the entry deletion request frame (S618), transfers the IGMP/MLD leave message received earlier (S613) to the gateway router 11 (S620).

As described above, according to the sixth embodiment, the gateway switch snoops the IGMP/MLD report message and the leave message transmitted from the apparatus located at the edge of the network to thereby manage a multicast delivery status for each of the mobile terminals, transmits, on behalf of the respective mobile terminals, the IGMP/MLD report message to the IP multicast router without transferring the IGMP/MLD query message from the IP multicast router to the respective mobile terminals, and, when there is no mobile terminal that request multicast delivery, does not transmit the IGMP/MLD report message. Thus, it is possible to reduce control traffic of a multicast procedure related to the maintenance of an IP multicast delivery route to the mobile terminals. Therefore, it is possible to establish a integrated heterogeneous mobile wireless network excellent is scalability.

Seventh Embodiment

In this seventh embodiment, as functions at the time when a network side starts handover based on layer 2 trigger information for starting handover transmitted from mobile terminals, apparatuses located at the edges of a network such as the edge switches 71 to 74, which are the layer 2 switches, or the wireless base stations 81 to 84 and 91 to 94, which are the radio access points, have a function of managing a multicast delivery status for each of the mobile terminals.

An apparatus located at the edge in a previous location, which has received notification of the start of handover from the network side, has a function of transferring, together with an identifier of a mobile terminal to be handed over, a context including information concerning multicast delivery of the mobile terminal to an apparatus located at the edge of a new location and a function of checking, after receiving a response to the transfer of the context from the apparatus located at the edge of the new location, whether other mobile terminals that request a multicast group and a distribution source requested by the handed-over mobile terminal remain and performing, when no such other mobile terminal does not remain, the transfer of a leave message in the multicast procedure "IGMP/MLD" and the transmission of an entry deletion frame for deleting an entry forming a transfer route for multicast to a gateway switch.

The apparatus located at the edge of the new location has a function of checking, based on the information concerning multicast delivery received from the apparatus located at the edge of the previous location and information concerning multicast delivery managed by the apparatus itself, whether the multicast delivery requested by the handed-over mobile terminal is carried out and, when the requested multicast delivery is not performed, transmitting, on behalf of the handed-over mobile terminal, an IGMP/MLD report message to an IP multicast router and transmitting an entry update frame for causing switches to learn an entry forming a transfer route for multicast in the direction of a gateway switch. A control operation for multicast communication according to the seventh embodiment is explained below referring to FIG. 8.

Figure 8:
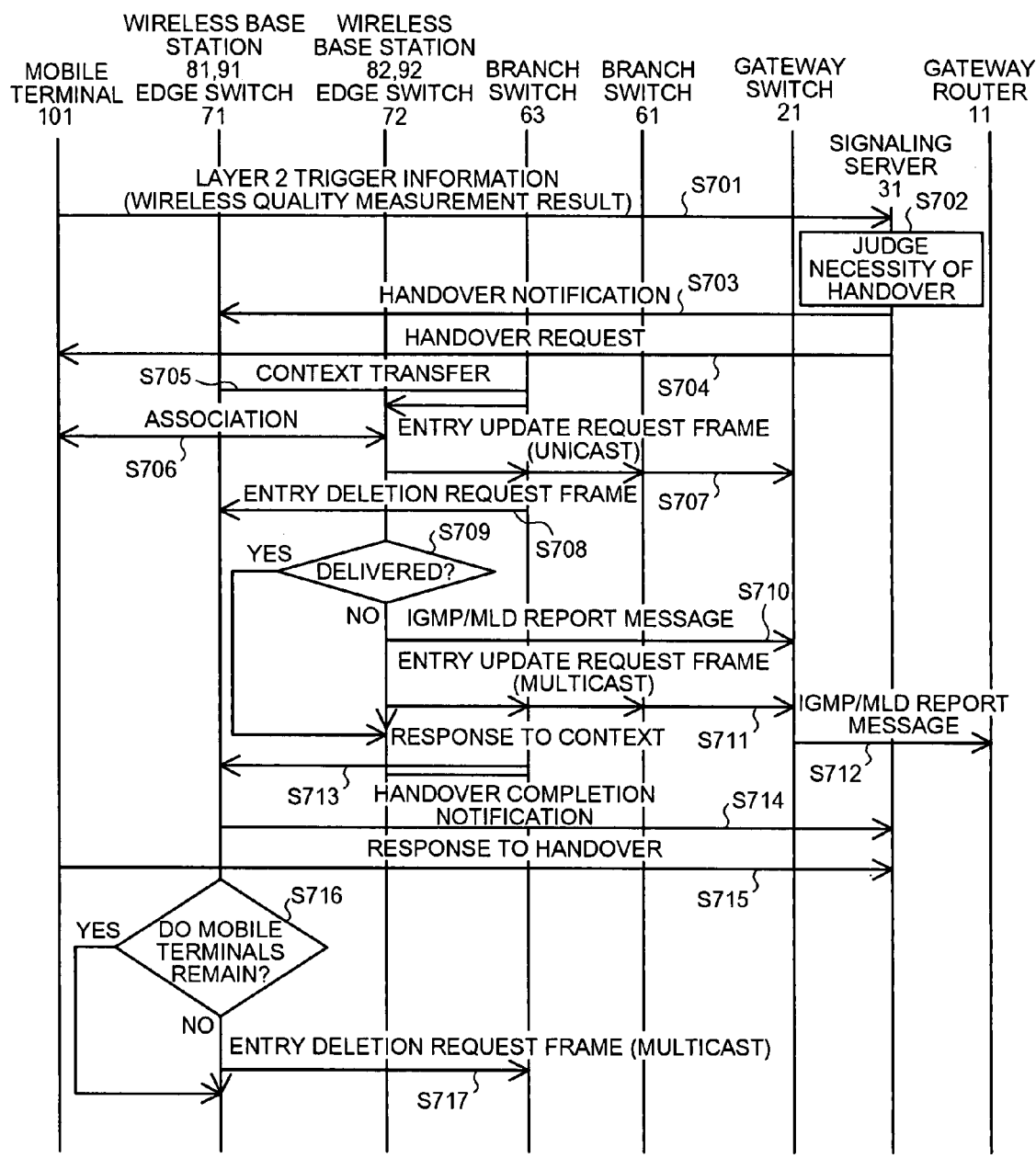
FIG. 8 is a sequence chart for explaining, as a seventh embodiment of the present invention, a control operation for multicast communication carried out in the layer 2 mobility network shown in FIG. 1.

FIG. 8 is a sequence chart for explaining, as the seventh embodiment of the present invention, a control operation for multicast communication carried out in the layer 2 mobility network shown in FIG. 1. In FIG. 8, a control operation performed when the mobile terminal 101 is handed over, based on a start instruction from the signaling server 31 on the network side, from the wireless base station 81 or 91 subordinate to the edge switch 71 to the wireless base station 82 or 92 subordinate to the edge switch 72 is shown.

In FIG. 8, the mobile terminal 101 transmits, when a radio quality of connection is deteriorated to be lower than a fixed threshold, a measurement result of the radio quality to the signaling server 31 as layer 2 trigger information for giving a trigger for handover control (S701). The signaling server 31 judges the necessity of handover based on the layer 2 trigger information transmitted from the mobile terminal 101 (S702), transmits handover notification (Handover Notification) to the wireless base station 81 or 91/the edge switch 71 (S703), and transmits a handover request (Handover Request) to the mobile terminal 101 (S704).

With the reception of the handover notification (S703) as a trigger, the wireless base station 81 or 91/the edge switch 71 transfers, together with an identifier of the mobile terminal 101 to be handed over, a context including information concerning multicast delivery of the mobile terminal 101 to the wireless base station 82 or 92/the edge switch 72 in a designated handover destination through the branch switch 63 (Context Transfer) (S705).

With the reception of the handover request (S704) as a trigger, the mobile terminal 101 sets association (Association) with the wireless base station 82 or 92/the edge switch 72 in the designated handover destination (S706). With the setting of this association as a trigger, the wireless base station 82 or 92/the edge switch 72 transmits an entry update request frame (Update Entry Request for Unicast) to the gateway switch 21 to form a new transfer route for unicast to the mobile terminal 101 (S707).

The branch switch 63, which has received the entry update request frame (S707), transmits an entry deletion request frame (Cancel Entry Request for Unicast) for deleting an entry forming a route before handover to the wireless base station 81 or 91/the edge switch 71 in the old route direction because the branch switch 63 itself is an origin for a route change in the layer 2 network of the tree structure shown in FIG. 1 (S708). When the wireless base station 81 or 91/the edge switch 71 receives the entry deletion request frame (S708), the wireless base station 81 or 91/the edge switch 71 deletes the entry forming the transfer route to the mobile terminal 101.

The wireless base station 82 or 92/the edge switch 72 checks presence or absence of a request for distribution to a multicast group/source of the mobile terminal 101 from the context information (S705) transmitted from the wireless base station 81 or 91/the edge switch 71 and, at the same time, when there is the distribution request, checks whether the requested distribution of the multicast group/source is performed (S709). As a result, when there is the distribution request and the distribution is not performed (S709: No), the wireless base station 82 or 92/the edge switch 72 transmits an IGMP/MLD report message to the gateway switch 21 to cause the switches to perform the distribution to the multicast group/source requested by the mobile terminal 101 (S710). The IGMP/MLD report message is IGMP Membership Report in the case of IPv4 and is MLD Listener Report in the case of IPv6.

The wireless base station 82 or 92/the edge switch 71 transmits, after the transmission of the IGMP/MLD report message (S710), an entry update request frame (Update Entry Request for Multicast) in the direction of the gateway switch 21 to cause the switches to learn an entry forming a transfer route for multicast (S711). The gateway switch 21 transfers, after the reception of the entry update request frame (S711), the IGMP/MLD report message (S710) received earlier to the gateway router 11 (S712).

Thereafter, the wireless base station 82 or 92/the edge switch 72 transmits a response to the transfer of the context information (Context Transfer Acknowledge) to the wireless base station 81 or 91/the edge switch 71 through the branch switch 63 (S713). This operation is also performed when there is the distribution request and the distribution is performed (S709: Yes). With the reception of the response to the transfer of the context information (S713) as a trigger, the wireless base station 81 or 91/the edge switch 71 transmits completion notification of the handover operation (Handover Complete) to the signaling server 31 (S714). A response to the handover request (S704) (Handover Response) is transmitted from the mobile terminal 101 to the signaling server 31 (S715).

The wireless base station 81 or 91/the edge switch 71 checks whether information on other mobile terminals that request the multicast group/source, distribution to which is requested by the mobile terminal 101, is present (S716). As a result, when the information is present (S716: Yes), the wireless base station 81 or 91/the edge switch 71 shifts to other processing. However, when the information is not present (S716: No), the wireless base station 81 or 91/the edge switch 71 transmits an entry deletion request frame for deleting the entry forming the transfer route for multicast delivery to the gateway switch 21 (S717).

At this point, when the branch switch 63 receives the entry deletion request frame (S717) from a port different from a port from which the entry update request frame (S711) for learning the entry forming a route for multicast delivery is transmitted, the branch switch 63 judges that the distribution route has been changed with the branch switch 63 itself as an origin and does not transfer the received entry deletion request frame (S717) to the higher-order branch switch 61 and the gateway switch 21. In FIG. 8, the operations in this case are shown.

When the branch switch 63 receives the entry deletion request frame (S717) from a port same as the port from which the entry update request frame (S711) is received, the branch switch 63 transfers the received entry deletion request frame to the higher-order branch switch 61 and the gateway switch 21. Consequently, all the entries forming the route for multicast delivery in the previous location are deleted.

As described above, according to the seventh embodiment, the apparatus located at the edge of the network manages a multicast delivery status for each of the mobile terminals. When handover is started from the network side based on the layer 2 trigger information for starting handover transmitted from the mobile terminals, the apparatus located at the edge of the previous location, which has received the start notification of handover from the network side, transfers, together with an identifier of a mobile terminal to be handed over, a context including information concerning multicast delivery of the mobile terminal to the apparatus located at the edge of the new location. On the other hand, the apparatus located at the edge of the new location checks, based on the received information concerning multicast delivery and information concerning multicast delivery managed by the apparatus itself, whether multicast delivery requested by the mobile terminal to be handed over is performed. When the requested multicast delivery is not performed, the apparatus transmits, on behalf of the mobile terminal to be handed over, an IGMP/MLD report message to an IP multicast router. The apparatus located at the edge of the new location transmits an entry update frame for causing the switches to learn an entry forming a transfer route for multicast. After receiving a response to the transfer of the context, the apparatus located at the edge of the previous location performs, when other mobile terminals that request the multicast group and the distribution source requested by the handed-over mobile terminal do not remain, the transfer of an IGMP/MLD leave message and the transmission of an entry deletion frame for deleting the entry forming the transfer route for multicast. Thus, the respective branch switches and the gateway switch can provide continuous IP multicast delivery to the mobile terminal to be handed over even if the branch switches and the gateway switch are not implemented with the function of snooping an IGMP/MLD message. In addition, because the apparatus located at the edge of the new location stops unnecessary transfer, it is possible to realize efficiency of control traffic. Therefore, it is possible to establish a integrated heterogeneous mobile wireless network excellent in scalability.

Eighth Embodiment

In this eighth embodiment, as functions at the time when a mobile terminal, which has detected layer 2 trigger information for starting handover, starts handover of the terminal itself, apparatuses located at the edges of a network such as the edge switches 71 to 74, which are the layer 2 switches, or the wireless base stations 81 to 84 and 91 to 94, which are the radio access points, have a function of managing a multicast delivery status for each of mobile terminals.

An apparatus located at the edge in a previous location, which has received notification of the start of handover from a mobile terminal side that starts handover, has a function of transferring, together with an identifier of a mobile terminal to be handed over, a context including information concerning multicast delivery of the mobile terminal to an apparatus located at the edge of a new location and a function of checking, after receiving a response to the transfer of the context from the apparatus located at the edge of the new location, whether other mobile terminals that request a multicast group and a distribution source requested by the handed-over mobile terminal remain and performing, when no such other mobile terminal does not remain, the transfer of a leave message in the multicast procedure "IGMP/MLD" and the transmission of an entry deletion frame for deleting an entry forming a transfer route for multicast.

The apparatus located at the edge of the new location has a function of checking, based on the information concerning multicast delivery received from the apparatus located at the edge of the previous location and information concerning multicast delivery managed by the apparatus itself, whether the multicast delivery requested by the mobile terminal to be handed over is carried out and, when the requested multicast delivery is not performed, transmitting, on behalf of the mobile terminal to be handed over, an IGMP/MLD report message to an IP multicast router and transmitting an entry update frame for causing switches to learn an entry forming a transfer route for multicast in the direction of a gateway switch. A control operation for multicast communication according to the eighth embodiment is explained below referring to FIG. 9.

Figure 9:
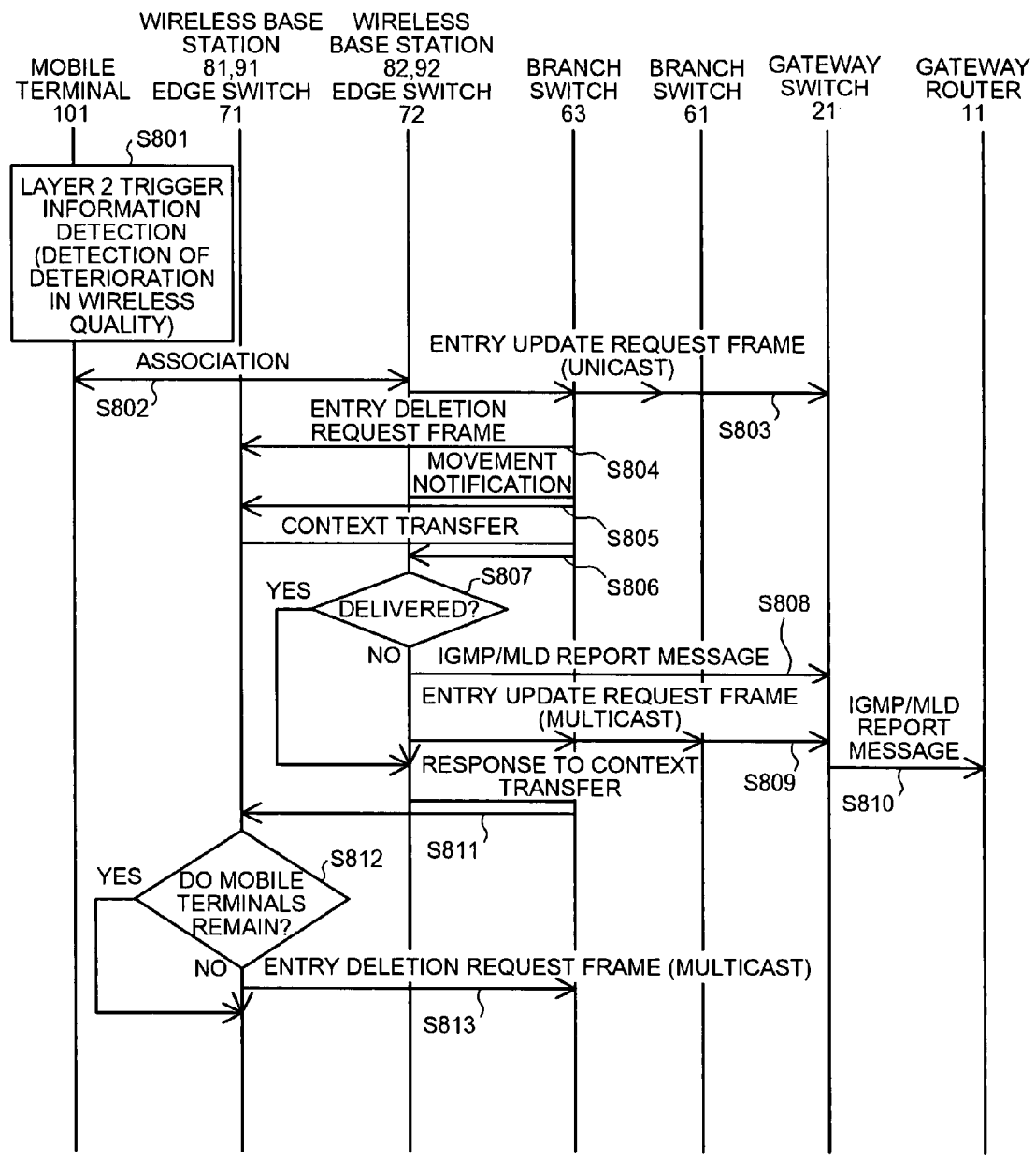
FIG. 9 is a sequence chart for explaining, as an eighth embodiment of the present invention, a control operation for multicast communication carried out in the layer 2 mobility network shown in FIG. 1.

FIG. 9 is a sequence chart for explaining, as the eighth embodiment of the present invention, a control operation for multicast communication carried out in the layer 2 mobility network shown in FIG. 1. In FIG. 9, a control operation performed when the mobile terminal 101 detects the generation of trigger information for starting handover and is handed over from the wireless base station 81 or 91 subordinate to the edge switch 71 to the wireless base station 82 or 92 subordinate to the edge switch 72 is shown.

In FIG. 9, the mobile terminal 101 detects, when a radio quality of connection with the wireless base station 81 or 91/the edge switch 71 is deteriorated to be lower than a fixed threshold, layer 2 trigger information as a trigger for switching wireless connection (S801) and sets association (Association) with another wireless base station 82 or 92/the edge switch 72 (S802). The wireless base station 82 or 92/the edge switch 72 transmits, with the setting of this association as a trigger, an entry update request frame (Update Entry Request for Unicast) in the direction of the gateway switch 21 to cause the respective switches to learn an entry forming a transfer route for unicast (S803).

The branch switch 63, which has received the entry update request frame (S803), transmits an entry deletion request frame (Cancel Entry Request for Unicast) for deleting an entry forming a route before handover to the wireless base station 81 or 91/the edge switch 71 in the old route direction because the branch switch 63 itself is an origin for a route change in the layer 2 network of the tree structure shown in FIG. 1 (S804). When the wireless base station 81 or 91/the edge switch 71 receives the entry deletion request frame (S804), the wireless base station 81 or 91/the edge switch 71 deletes the entry forming the transfer route to the mobile terminal 101.

Thereafter, the wireless base station 82 or 92/the edge switch 72 transmits movement notification (Move Notify) to the wireless base station 81 or 91/the edge switch 71 through the branch switch 63 from information on the wireless base station 81 or 91/the edge switch 71, which has been connected the mobile terminal 101 immediately before the setting with the mobile terminal 101, obtained in the association setting (S805). In response to the movement notification (S805), the wireless base station 81 or 91/the edge switch 71 transfers, together with the identifier of the handed-over mobile terminal 101, a context including information concerning multicast delivery of the mobile terminal 101 to the wireless base station 82 or 92/the edge switch 72 (Context Transfer) (S806).

The wireless base station 82 or 92/the edge switch 72 checks presence or absence of a distribution request to a multicast group/source from the context information transmitted from the wireless base station 81 or 91/edge switch 71 and, at the same time, when the distribution request is present, checks whether the distribution of the requested multicast group/source is performed (S807). As a result, when the distribution request is present and the distribution is not performed (S807: No), the wireless base station 82 or 92/the edge switch 72 transmits an IGMP/MLD report message to the gateway switch 21 to cause the gateway switch 21 to perform the distribution to the multicast group/source requested by the mobile terminal 101 (S808). The IGMP/MLD report message is IGMP Membership Report in the case of IPv4 and is MLD Listener Report in the case of IPv6.

The wireless base station 82 or 92/the edge switch 72 transmits, after the transmission of the IGMP/MLD report message (S808), an entry update request frame (Update Entry Request for Multicast) for causing the switches to learn an entry forming a transfer route for multicast to the mobile terminal 101 in the direction of the gateway switch 21 (S809). The gateway switch 21 transfers, after the reception of the entry update request frame (S809), the IGMP/MLD report message (S808) received earlier to the gateway router 11 (S810).

Thereafter, the wireless base station 82 or 92/the edge switch 72 transmits a response to the transfer of the context information (Context Transfer Acknowledge) to the wireless base station 81 or 91/the edge switch 71 through the branch switch 63 (S811). This operation is also performed when there is the distribution request and the distribution is performed (S807: Yes).

With the reception of the response to the transfer of the context information (S811) as a trigger, the wireless base station 81 or 91/the edge switch 71 checks whether information on other mobile terminals that request the multicast group/source, distribution to which is requested by the mobile terminal 101, is present (S812). As a result, when the information is present (S812: Yes), the wireless base station 81 or 91/the edge switch 71 shifts to other processing. However, when the information is not present (S812: No), the wireless base station 81 or 91/the edge switch 71 transmits an entry deletion request frame for deleting the entry forming the transfer route for multicast delivery to the gateway switch 21 (S813).

At this point, when the branch switch 63 receives the entry deletion request frame (S813) from a port different from a port from which the entry update request frame (S809) for learning the entry forming a route for multicast delivery is transmitted, the branch switch 63 judges that the distribution route has been changed with the branch switch 63 itself as an origin and does not transfer the received entry deletion request frame (S813) to the higher-order branch switch 61 and the gateway switch 21. In FIG. 9, the operations in this case are shown.

When the branch switch 63 receives the entry deletion request frame (S813) from a port same as the port from which the entry update request frame (S809) is received, the branch switch 63 transfers the received entry deletion request frame to the higher-order branch switch 61 and the gateway switch 21. Consequently, all the entries forming the route for multicast delivery in the previous location are deleted.

As described above, according to the eighth embodiment, the apparatus located at the edge of the network manages a multicast delivery status for each of the mobile terminals. When the mobile terminal, which has detected layer 2 trigger information for starting hand over, starts handover of the mobile terminal itself, the apparatus located at the edge of the previous location, which has received the start notification of handover from the mobile terminal, transfers, together with an identifier of a mobile terminal to be handed over, a context including information concerning multicast delivery of the mobile terminal to the apparatus located at the edge of the new location. On the other hand, the apparatus located at the edge of the new location checks, based on the received information concerning multicast delivery and information concerning multicast delivery managed by the apparatus itself, whether multicast delivery requested by the mobile terminal to be handed over is performed. When the requested multicast delivery is not performed, the apparatus transmits, on behalf of the mobile terminal to be handed over, an IGMP/MLD report message to an IP multicast router. The apparatus located at the edge of the new location transmits an entry update frame for causing the switches to learn an entry forming a transfer route for multicast. After receiving a response to the transfer of the context, the apparatus located at the edge of the previous location performs, when other mobile terminals that request the multicast group and the distribution source requested by the handed-over mobile terminal do not remain, the transfer of an IGMP/MLD leave message and the transmission of an entry deletion frame for deleting the entry forming the transfer route for multicast. Thus, the respective branch switches can provide continuous IP multicast delivery to the mobile terminal to be handed over even if the branch switches are not implemented with the function of snooping an IGMP/MLD message. In addition, because the apparatus located at the edge of the new location stops unnecessary transfer, it is possible to realize efficiency of control traffic. Therefore, it is possible to establish a integrated heterogeneous mobile wireless network excellent in scalability.

Ninth Embodiment

In this ninth embodiment, as functions at the time when a network side starts handover based on layer 2 trigger information for starting handover transmitted from mobile terminals, apparatuses located at the edges of a network such as the edge switches 71 to 74, which are the layer 2 switches, or the wireless base stations 81 to 84 and 91 to 94, which are the radio access points, have a function of managing a multicast delivery status for each of the mobile terminals.

An apparatus located at the edge in a previous location, which has received notification of the start of handover from the network side, has a function of transferring, together with an identifier of a mobile terminal to be handed over, a context including information concerning multicast delivery of the mobile terminal to an apparatus located at the edge of a new location and a function of transmitting, on behalf of an IP multicast router, a query message in the multicast procedure "IGMP/MLD" to the handed-over mobile terminal, checking whether other mobile terminals that request a multicast group and a distribution source requested by the handed-over mobile terminal remain, and performing, when no such other mobile terminal does not remain, the transfer of an IGMP/MLD leave message and the transmission of an entry deletion frame for deleting an entry forming a transfer route for multicast to the gateway switch 21.

The apparatus located at the edge of the new location has a function of transmitting, on behalf of the IP multicast router, a query message in the multicast procedure to a mobile terminal that has moved to the new location, snooping a report message in the multicast procedure transmitted by the mobile terminal, and transmitting an entry update frame for causing the switches to learn an entry forming a transfer route for multicast to the gateway switch 21 and a function of transmitting a response to the transfer of the context including notification of leave to the apparatus located at the edge of the previous location. A control operation for multicast communication according to the ninth embodiment is explained below referring to FIG. 10.

Figure 10:
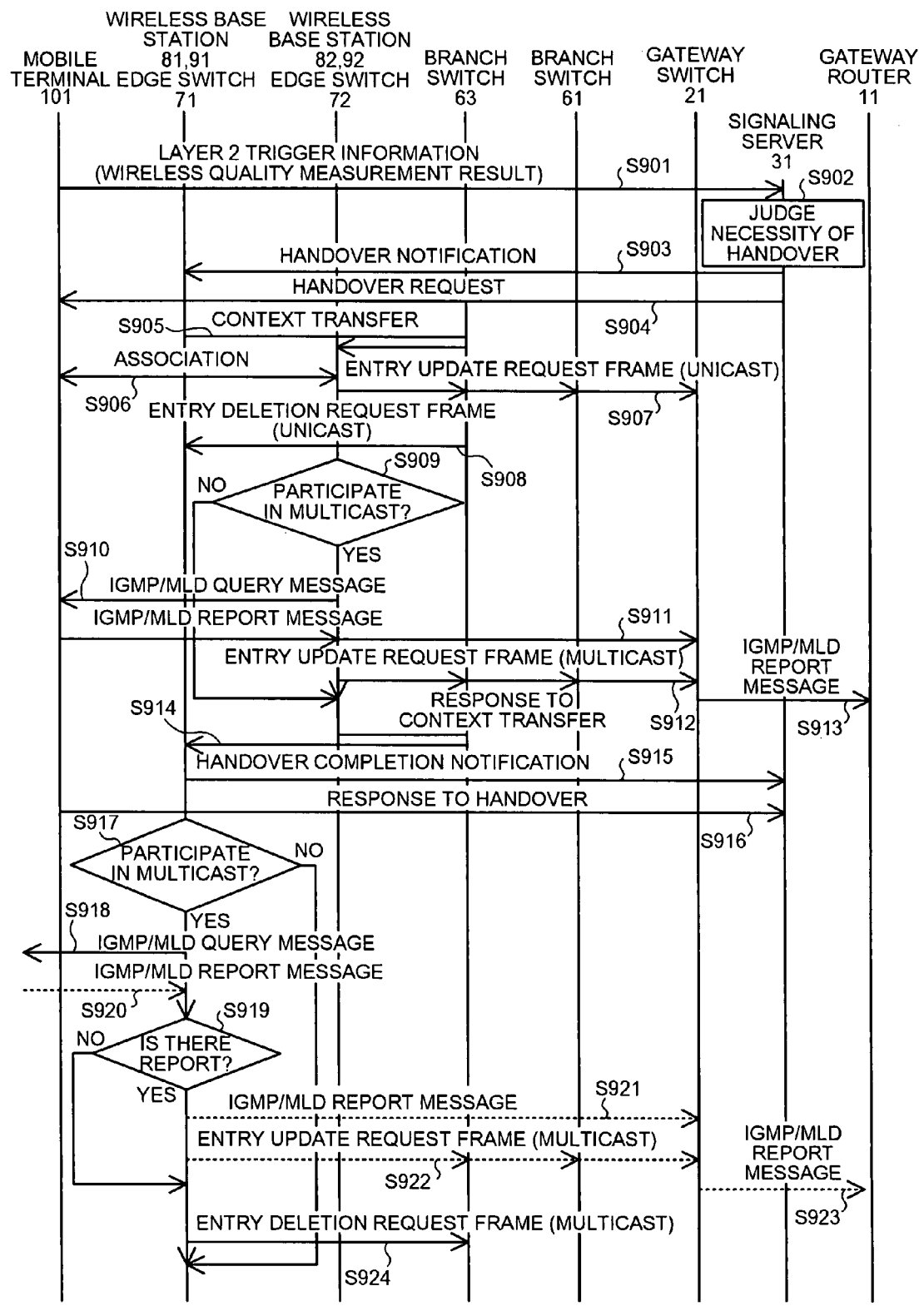
FIG. 10 is a sequence chart for explaining, as a ninth embodiment of the present invention, a control operation for multicast communication carried out in the layer 2 mobility network shown in FIG. 1.
Figure 11:
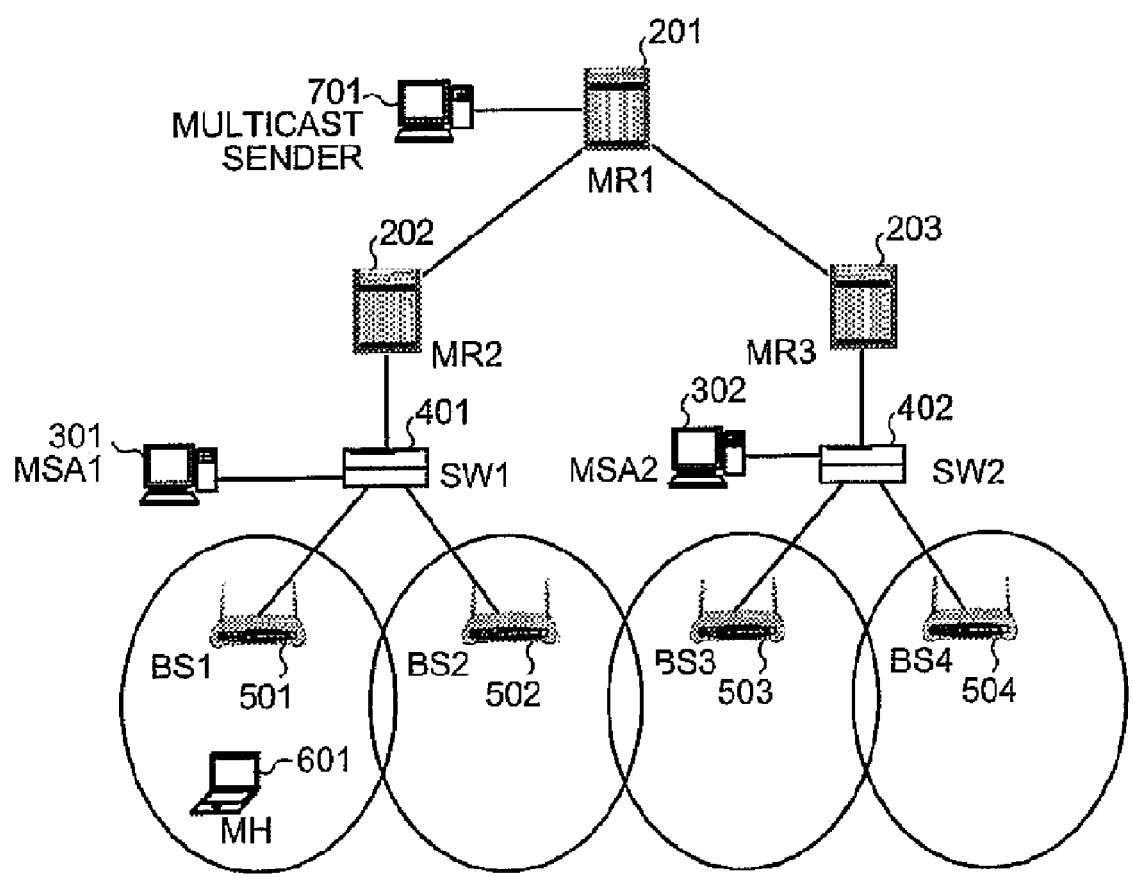
FIG. 11 is a conceptual diagram of a structure of the conventional integrated heterogeneous mobile wireless network.
Figure 12:
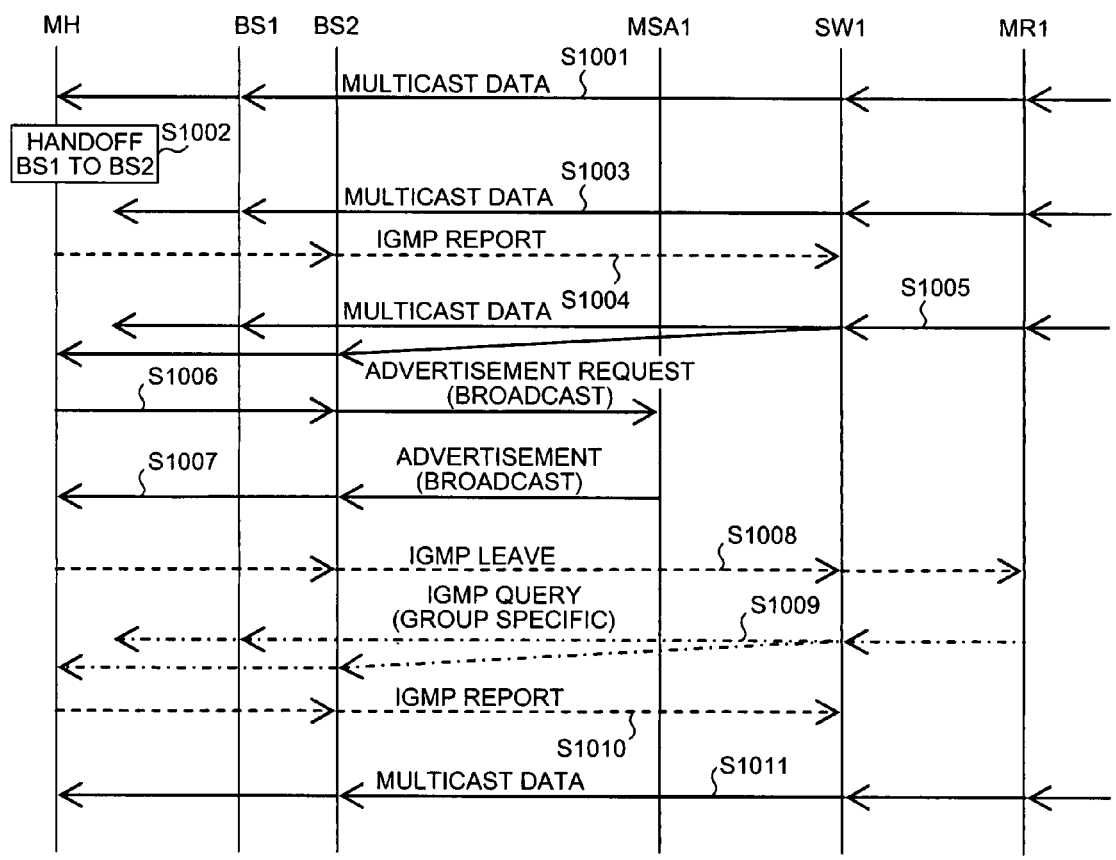
FIG. 12 is a sequence chart for explaining a control operation for handoff for a multicast receiver carried out in the same sub-network in the integrated heterogeneous mobile wireless network shown in FIG. 11.
Figure 13:
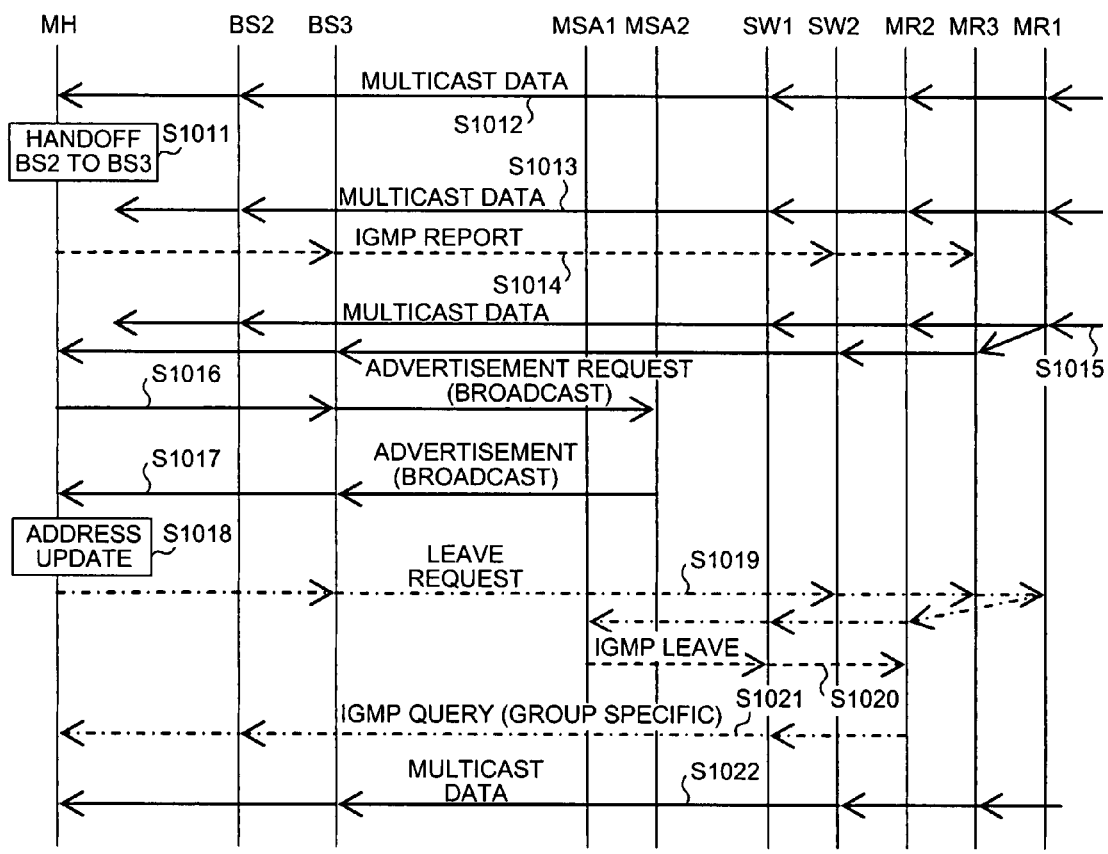
FIG. 13 is a sequence chart for explaining a control operation for handoff for a multicast receiver carried out between different sub-networks in the integrated heterogeneous mobile wireless network shown in FIG. 11.

FIG. 10 is a sequence chart for explaining, as the ninth embodiment of the present invention, a control operation for multicast communication carried out in the layer 2 mobility network shown in FIG. 1. In FIG. 10, a control operation performed when the mobile terminal 101 is handed over, based on a start instruction of the signaling server 31, from the wireless base station 81 or 91 subordinate to the edge switch 71 to the wireless base station 82 or 92 subordinate to the edge switch 72 is shown.

In FIG. 10, the mobile terminal 101 transmits, when a radio quality of connection is deteriorated to be lower than a fixed threshold, a measurement result of the radio quality to the signaling server 31 as layer 2 trigger information for giving a trigger for handover control (S901). The signaling server 31 judges the necessity of handover based on the layer 2 trigger information transmitted from the mobile terminal 101 (S902), transmits handover notification (Handover Notification) to the wireless base station 81 or 91/the edge switch 71 (S903), and transmits a handover request (Handover Request) to the mobile terminal 101 (S904).

With the reception of the handover notification (S903) as a trigger, the wireless base station 81 or 91/the edge switch 71 transfers, together with an identifier of the mobile terminal 101 to be handed over, a context including information concerning multicast delivery of the mobile terminal 101 to the wireless base station 82 or 92/the edge switch 72 in a designated handover destination through the branch switch 63 (Context Transfer) (S905).

With the reception of the handover request (S904) as a trigger, the mobile terminal 101 sets association (Association) with the wireless base station 82 or 92/the edge switch 72 in the designated handover destination (S906). With the setting of this association as a trigger, the wireless base station 82 or 92/the edge switch 72 transmits an entry update request frame (Update Entry Request for Unicast) to in the direction of the gateway switch 21 to form a new transfer route for unicast to the mobile terminal 101 (S907).

The branch switch 63, which has received the entry update request frame (S907), transmits an entry deletion request frame (Cancel Entry Request for Unicast) for deleting an entry forming a route before handover to the wireless base station 81 or 91/the edge switch 71 in the old route direction because the branch switch 63 itself is an origin for a route change in the layer 2 network of the tree structure shown in FIG. 1 (S908). When the wireless base station 81 or 91/the edge switch 71 receives the entry deletion request frame (S908), the wireless base station 81 or 91/the edge switch 71 deletes the entry forming the transfer route to the mobile terminal 101.

The wireless base station 82 or 92/the edge switch 72 checks presence or absence of a distribution request to a multicast group/source of the mobile terminal 101 from the context information (S905) transmitted from the wireless base station 81 or 91/the edge switch 71 (S909). As a result, when there is the distribution request (S909: Yes), the wireless base station 82 or 92/the edge switch 72 transmits, on behalf of the gateway router 11, an IGMP/MLD query message in the direction of the mobile terminal 101 (S910). The IGMP/MLD query message is IGMP Membership Query in the case of IPv4 and is MLD Listener Query in the case of IPv6.

The mobile terminal 101, which has received the IGMP/MLD query message (S910), transmits an IGMP/MLD report message to the gateway router 11 through the wireless base station 82 or 92/the edge switch 72 to request the distribution of multicast (S911). The IGMP/MLD report message is IGMP Membership Report in the case of IPv4 and is MLD Listener Report in the case of IPv6.

The wireless base station 82 or 92/the edge switch 72 snoops the IGMP/MLD report message (S911) relayed and transferred in the direction of the gateway router 11 and transmits an entry update request frame (Update Entry Request for Multicast) for causing the switches to learn an entry forming a transfer route for multicast in the direction of the gateway switch 21 (S912). The gateway switch 21 transfers the IGMP/MLD report message (S911) received earlier to the gateway router 11 after the reception of the entry update request frame (S912).

Thereafter, the wireless base station 82 or 92/the edge switch 72 transmits a response to the transfer of the context information (S905) (Context Transfer Acknowledge) to the wireless base station 81 or 91/the edge switch 71 through the branch switch 63 (S914). This operation is also performed when there is no distribution request (S909: No).

With the response to the transfer of the context information (S914) as a trigger, the wireless base station 81 or 91/the edge switch 71 transmits completion notification of the handover operation (Handover Complete) to the signaling server 31

(S915). A response to the handover request (S904) (Handover Response) is transmitted to the signaling server 31 from the mobile terminal 101 (S916).

The wireless base station 81 or 91/the edge switch 71 checks whether the handed-over mobile terminal 101 has made a request for distribution to a multicast group/source (S917). As a result, when the handed-over mobile terminal 101 has not made the distribution request (S917: No), the wireless base station 81 or 91/the edge switch 71 shifts to other processing (S917: Yes). However, when the handed-over mobile terminal 101 has made the distribution request (S917: Yes), the wireless base station 81 or 91/the edge switch 71 transmits, on behalf of the gateway router 11, an IGMP/MLD query message to the mobile terminals side to check presence or absence of other mobile terminals that make the distribution request (S918) and checks presence or absence of the transmission of an IGMP/MLD report message from the other mobile terminals (S919).

When an IGMP/MLD report message (S920) is transmitted from the other mobile terminals (S919: Yes), the wireless base station 81 or 91/the edge switch 71 transmits the received IGMP/MLD report message (S920) to the gateway switch 21 (S921). Thereafter, the wireless base station 81 or 91/the edge switch 71 transmits an entry update request frame (Update Entry Request for Multicast) for causing the switches to learn an entry forming a transfer route for multicast in the direction of the gateway switch 21 (S922).

The gateway switch 21 transfers, after the reception of the entry update request frame (S922), the IGMP/MLD report message (S920) received earlier to the gateway router 11 (S923).

On the other hand, when no IGMP/MLD report message is transmitted from the other mobile terminals in response to the IGMP/MLD query message (S918) (S919: No), there is no information on other mobile terminals that request the multicast group/source, distribution to which is requested by the mobile terminal 101. Thus, the wireless base station 81 or 91/the edge switch 71 transmits an entry deletion request frame for deleting the entry forming the transfer route for multicast delivery to the gateway switch 21 (S924).

At this point, when the branch switch 63 receives the entry deletion request frame (S924) from a port different from a port from which the entry update request frame (S922) for learning an entry forming a route for multicast delivery is transmitted, the branch switch 63 judges that the distribution route has been changed with the branch switch 63 itself as an origin and does not transfer the entry deletion request frame (S924) to the higher-order branch switch 61 and the gateway switch 21. In FIG. 10, the operations in this case are shown.

Only when the branch switch 63 receives the entry deletion request frame from a port same as the port from which the entry update request frame (S922) is received, the branch switch 63 transfers the entry deletion request frame (S924) to the higher-order branch switch 61 and the gateway switch 21. Consequently, all the entries forming the route for multicast delivery in the previous location are deleted.

As described above, according to the ninth embodiment, the apparatus located at the edge of the network manages a multicast delivery status for each of the mobile terminals. When handover is started from the network side based on the layer 2 trigger information for starting handover transmitted from the mobile terminals, the apparatus located at the edge of the previous location, which has received the start notification of handover from the network side, transfers, together with an identifier of a mobile terminal to be handed over, a context including information concerning multicast delivery of the mobile terminal to the apparatus located at the edge of the new location. On the other hand, the apparatus located at the edge of the new location transmits, on behalf of the IP multicast router, an IGMP/MLD query message to a mobile terminal that has moved to the new location, snoops an IGMP/MLD report message transmitted by the mobile terminal, and transmits an entry update frame for causing the switches to learn an entry forming a transfer route for multicast. Moreover, the apparatus located at the edge of the new location transmits a response to the transfer of the context including notification of leave to the apparatus located at the edge of the previous location. At the same time, the apparatus located at the edge of the previous location transmits, on behalf of the IP multicast router, an IGMP/MLD query message to the mobile terminals subordinate to the apparatus. When other mobile terminals that request the multicast group and the distribution source requested by the handed-over mobile terminal do not remain, the apparatus performs the transfer of an IGMP/MLD leave message and the transmission of an entry deletion frame for deleting an entry forming a transfer route for multicast to the gateway switch. Thus, the respective branch switches and the gateway switch can provide continuous IP multicast delivery to the mobile terminal to be handed over even if the branch switches and the gateway switch are not implemented with the function of snooping an IGMP/MLD message. In addition, because the apparatus located at the edge of the new location stops unnecessary transfer, it is possible to realize efficiency of control traffic. Therefore, it is possible to establish a integrated heterogeneous mobile wireless network excellent in scalability.

INDUSTRIAL APPLICABILITY

As described above, the layer 2 mobility network according to the present invention is useful for stopping unnecessary transfer (forwarding) and suppress traffic during multicast delivery even if all switches constituting a sub-network are not implemented with a function of snooping various messages of the multicast procedure "IGMP/MLD". In particular, the layer 2 mobility network is suitable for establishing a integrated heterogeneous mobile wireless network that suppresses control traffic related to the multicast procedure "IGMP/MLD" and is excellent in scalability.

The invention claimed is:

1. A layer 2 mobility network comprising:
   a layer 2 switch that is a base of a heterogeneous wireless access system;
   an IP multicast router that performs a mutual connection in an IP layer with an external network to which a source of a multicast communication is connected; and
   a gateway switch interposed between a plurality of the layer 2 switches and the IP multicast router connected via a relay transfer path, wherein:
   a radio access point of the heterogeneous wireless access system or the layer 2 switch is configured as an apparatus located at an edge of the network for selectively performing first and second functions for executing multicast delivery to a mobile terminal in response to receiving a report message in a multicast procedure transmitted by the mobile terminal,
   the apparatus located at the edge of the network and the gateway switch each maintains a management table for managing the multicast delivery,
   the first function is a function of transmitting the report message to the gateway switch, and
   the second function is a function of snooping the report message to learn a transfer route for the multicast delivery, and transmitting an entry update request frame in a direction of the gateway switch for causing the gateway switch to learn an entry, in the management table of the gateway switch, forming the learned transfer route for the multicast delivery, upon receiving the report message, the apparatus located at the edge of the network determines whether or not to perform the first and second functions by referring to the management table of the apparatus to check whether a same multicast group and a same distribution source have already been requested, the apparatus determining to perform the first and second functions when the same multicast group and the same distribution source have not been requested, and upon receiving a report message in the multicast procedure transmitted from the apparatus located at the edge of the network, the gateway switch is configured to perform functions of:

registering a multicast group/source combination, distribution to which is requested, in the management table of the gateway switch; and transferring the received report message to a port to which the IP multicast router is connected after receiving the entry update request frame transmitted from the apparatus located at the edge of the network, and when a query message periodically transmitted by the IP multicast router is transferred to a multicast group/source combination registered within the management table of the gateway switch, the gateway switch is configured to perform a function of: transmitting on behalf of mobile terminals belonging to the multicast group/source combination a report message in the multicast procedure to the IP multicast router without transferring the query message to mobile terminals belonging to the multicast group/source combination.

2. The layer 2 mobility network according to claim 1, wherein for a situation where the mobile terminal that has been receiving a multicast delivery leaves the multicast group, the apparatus located at the edge of the network is configured to perform functions comprising:

a function of:

snooping, when the apparatus receives a leave message in the multicast procedure from the mobile terminal, the leave message before transferring the leave message to the IP multicast router, and confirming that a report message in the multicast procedure responding to a query message in the multicast procedure from the IP multicast router is transmitted from the mobile terminal in a fixed time; and a function of transmitting, when the report message in the multicast procedure is not transmitted from the mobile terminal in the fixed time, an entry deletion request frame for deleting the entry forming the transfer route for multicast in the direction of the gateway switch.

3. The layer 2 mobility network according to claim 1, wherein for a situation where the mobile terminal that has been receiving a multicast delivery leaves the multicast group, the apparatus located at the edge of the network is configured to perform functions of when the apparatus receives a leave message in the multicast procedure from the mobile terminal, checking whether terminals that request multicast delivery of a same multicast group and a same distribution source remain by referring to a management table for managing a multicast delivery status for each of mobile terminals before transferring the leave message to the IP multicast router; and when there remains no terminal that requests delivery of the same multicast group and the same distribution source, transferring the leave message in the multicast procedure received from the mobile terminal to the gateway switch and transmitting an entry deletion request frame for deleting an entry forming the transfer route for multicast in the direction of the gateway switch, and the gateway switch is configured to perform a function of transferring, after the transfer route for multicast is deleted, the received leave message to a port to which the IP multicast router is connected.

4. The layer 2 mobility network according to claim 1, wherein for coping with requests for a multicast delivery to a same distribution source by a plurality of mobile terminals belonging to a same multicast group, the gateway switch is configured to perform a function of filtering a query message in the multicast procedure periodically transmitted from the IP multicast router into the network, which is not to be relayed or transferred, and the apparatus located at the edge of the network is configured to perform functions of:

periodically transmitting, on behalf of the IP multicast router, a query message in the multicast procedure to a plurality of mobile terminals subordinate to the IP multicast router;

when the apparatus receives report messages in the multicast procedure from the mobile terminals subordinate to the IP multicast router, before carrying out the first function, checking whether the same multicast group and the same distribution source have already been requested by referring to a management table for managing a multicast delivery status for each of the mobile terminals, and when the same multicast group and the same distribution source have not been requested, carrying out the first function and the second function for the mobile terminals.

5. The layer 2 mobility network according to claim 1, wherein for a situation where a network side starts handover based on layer 2 trigger information for starting handover transmitted from the mobile terminal, or where a mobile terminal that has detected layer 2 trigger information for starting handover starts handover of the mobile terminal itself, the apparatus located at the edge of the network is further configured to perform a function of managing a multicast delivery status for each of the mobile terminals, an apparatus located at an edge of a previous location, which has received notification of the start of handover, is configured to perform functions of:

transferring, together with an identifier of a mobile terminal to be handed over, a context including information concerning multicast delivery of the mobile terminal to an apparatus located at an edge of a new location;

checking, after receiving a response to the transfer of the context from the apparatus located at the edge of the new location, whether other mobile terminals that request a multicast group and a distribution source requested by the handed-over mobile terminal remain; and when no such other mobile terminal remains, transferring a leave message in the multicast procedure and transmitting an entry deletion frame for deleting an entry forming a transfer route for multicast to the gateway switch, and the apparatus located at the edge of the new location is configured to perform functions of:

checking, based on the information concerning multicast delivery received from the apparatus located at the edge of the previous location and information concerning multicast delivery managed by the apparatus itself, whether the multicast delivery requested by the handed-over mobile terminal is carried out; and when the requested multicast delivery is not performed, transmitting, on behalf of the handed-over mobile terminal, a report message in a multicast procedure to the IP multicast router, and transmitting an entry update frame for causing the switches to learn an entry forming a transfer route for multicast in the direction of the gateway switch.

6. The layer 2 mobility network according to claim 1, wherein for a situation where a network side starts handover based on layer 2 trigger information for starting handover transmitted from the mobile terminal, the apparatus located at the edge of the network such as the radio access point of the heterogeneous wireless access system or the layer 2 switch is configured to perform a function of managing a multicast delivery status for each of the mobile terminals, an apparatus located at an edge in a previous location, which has received notification of the start of handover from the network, is configured to perform functions of:

transferring, together with an identifier of a mobile terminal to be handed over, a context including information concerning multicast delivery of the mobile terminal to an apparatus located at an edge of a new location;

transmitting, on behalf of the IP multicast router, a query message in the multicast procedure to a mobile terminal subordinate to the IP multicast router; and when no other mobile terminals that request a multicast group and a distribution source requested by the handed-over mobile terminal remain, transferring a leave message in the multicast procedure and transmitting an entry deletion frame for deleting an entry forming a transfer route for multicast to the gateway switch, and the apparatus located at the edge of the new location is configured to perform functions of:

transmitting, on behalf of the IP multicast router, a query message in the multicast procedure to a mobile terminal that has moved to the new location;

snooping a report message in the multicast procedure transmitted by the mobile terminal;

transmitting an entry update frame for causing the switches to learn an entry forming a transfer route for multicast to the gateway switch; and transmitting a response to the transfer of the context including notification of leave to the apparatus located at the edge of the previous location.

7. A layer 2 mobility network comprising:

a layer 2 switch that is a base of a heterogeneous wireless access system;

an IP multicast router that performs a mutual connection in an IP layer with an external network to which a source of a multicast communication is connected; and a gateway switch interposed between a plurality of the layer 2 switches and the IP multicast router connected via a relay transfer path, wherein:

a radio access point of the heterogeneous wireless access system or the layer 2 switch is configured as an apparatus located at an edge of the network, the apparatus located at the edge of the network and the gateway switch each maintains a management table for managing the multicast delivery, the apparatus located at the edge of the network is configured to perform functions for executing multicast delivery to a mobile terminal comprising:

a first function of transmitting a report message in a multicast procedure transmitted by the mobile terminal to the gateway switch; and a second function of snooping the report message to learn a transfer route for the multicast delivery, and transmitting an entry update request frame in a direction of the gateway for causing the gateway switch to learn an entry, in the management table of the gateway switch, forming the learned transfer route for the multicast delivery, in a situation where the mobile terminal that has been receiving a multicast delivery leaves the multicast group, the apparatus located at the edge of the network is configured to perform functions of:

when the apparatus receives a leave message in the multicast procedure from the mobile terminal, snooping the leave message before transferring the leave message to the IP multicast router and confirming that a report message in the multicast procedure responding to a query message in the multicast procedure from the IP multicast router is transmitted from the mobile terminal in a fixed time; and when the report message in the multicast procedure is transmitted from the mobile terminal in the fixed time, relearning a transfer route for multicast and transmitting an entry update request frame for causing the switches to learn an entry forming the relearned transfer route for multicast in the direction of the gateway switch, upon receiving a report message in the multicast procedure transmitted from the apparatus located at the edge of the network, the gateway switch is configured to perform functions of:

registering a multicast group/source combination, distribution to which is requested, in the management table of the gateway switch; and transferring the received report message to a port to which the IP multicast router is connected after receiving the entry update request frame transmitted from the apparatus located at the edge of the network, and when a query message periodically transmitted by the IP multicast router is transferred to a multicast group/source combination registered within the management table of the gateway switch, the gateway switch is configured to perform a function of:

transmitting on behalf of mobile terminals belonging to the multicast group/source combination a report message in the multicast procedure to the IP multicast router without transferring the query message to mobile terminals belonging to the multicast group/ source combination.

8. A layer 2 mobility network comprising:
a layer 2 switch that is a base of a heterogeneous wireless access system;
an IP multicast router that performs a mutual connection in an IP layer with an external network to which a source of a multicast communication is connected; and
a gateway switch interposed between a plurality of the layer 2 switches and the IP multicast router connected via a relay transfer path, wherein
a radio access point of the heterogeneous wireless access system or the layer 2 switch is configured as an apparatus located at the edge of the network for performing functions of:
  checking, when the apparatus receives a report message in a multicast procedure from a mobile terminal, whether a same multicast group and a same distribution source have already been requested by referring to a management table of the apparatus for managing a multicast delivery status for each of mobile terminals; and
  when the same multicast group and the same distribution source have not been requested, transmitting the report message to the gateway switch, snooping the report message to learn a transfer route for multicast, and transmitting an entry update request frame for causing the switches to learn an entry forming the learned transfer route for multicast in a direction of the gateway switch,
the apparatus located at the edge of the network being further configured to perform functions of:
  checking, when the apparatus receives a leave message in the multicast procedure from the mobile terminal, before transferring the leave message to the IP multicast router, whether mobile terminals that request multicast delivery of the same multicast group and the same distribution source remain by referring to the management table of the apparatus for managing a multicast delivery status for each of the mobile terminals, and
  when no such mobile terminal remains, transferring the leave message in the multicast procedure received from the mobile terminal to the gateway switch, and transmitting an entry deletion request frame for deleting an entry forming the transfer route for multicast in the direction of the gateway switch, and the gateway switch is configured to perform functions of:
  snooping a report message in the multicast procedure transmitted from the apparatus located at the edge of the network;
  registering a multicast group/source combination, distribution to which is requested, in a management table of the gateway switch for managing a multicast delivery status for each of mobile terminals; and
  transmitting the received report message in the multicast procedure to the IP multicast router after receiving the entry update request frame transmitted after the report message; the gateway switch being further configured to perform functions of:
  transmitting, on behalf of the mobile terminal, the report message in the multicast procedure to the IP multicast router when a query message periodically transmitted by the IP multicast router is not transferred to the respective mobile terminals but is transferred to the multicast group/ source combination, distribution to which is requested referring to the management table of the gateway switch; and
the gateway switch being further configured to perform functions of:
  receiving a leave message in the multicast procedure transmitted from the apparatus located at the edge of the network,
  deleting a multicast group/source combination, leave from which is displayed, from the management table of the gateway switch, and
  transmitting the received leave message in the multicast procedure to the IP multicast router after the reception of the entry deletion request frame transmitted after the leave message.

9. The layer 2 mobility network according to claim 8, wherein the gateway switch does not transmit, on behalf of the mobile terminal, a report message in the multicast procedure to the IP multicast router when the query message in the multicast procedure periodically transmitted by the IP multicast router is not transferred to the respective mobile terminals and there is no mobile terminal that request multicast delivery referring to the management table.

* * * * *